(12) United States Patent
Kuwajima et al.

(10) Patent No.: US 7,218,479 B2
(45) Date of Patent: May 15, 2007

(54) HEAD SUPPORT DEVICE WITH BEARING AND ELASTIC MEMBER

(75) Inventors: Hideki Kuwajima, Kyoto (JP); Hideyuki Hashi, Osaka (JP); Mitsuhisa Yoshimura, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 428 days.

(21) Appl. No.: 10/497,026

(22) PCT Filed: Aug. 5, 2003

(86) PCT No.: PCT/JP03/09912

§ 371 (c)(1),
(2), (4) Date: May 28, 2004

(87) PCT Pub. No.: WO2004/013842

PCT Pub. Date: Feb. 12, 2004

(65) Prior Publication Data

US 2005/0018358 A1    Jan. 27, 2005

(30) Foreign Application Priority Data

| Aug. 6, 2002 | (JP) | ............................. 2002-228861 |
| Jan. 15, 2003 | (JP) | ............................. 2003-007195 |
| Mar. 18, 2003 | (JP) | ............................. 2003-073871 |

(51) Int. Cl.
*G11B 5/55* (2006.01)
(52) U.S. Cl. ................ 360/244.5; 360/244.8; 360/265.9
(58) Field of Classification Search .......... 360/265.9, 360/294.7, 244.5, 244.8, 266.1
See application file for complete search history.

(56) References Cited

U.S. PATENT DOCUMENTS

| 4,399,476 A |   | 8/1983 | King |
| 5,012,369 A | * | 4/1991 | Owe et al. ................ 360/294.7 |
| 5,657,187 A |   | 8/1997 | Hatch et al. |
| 5,936,803 A | * | 8/1999 | Berding .................... 360/244.8 |

FOREIGN PATENT DOCUMENTS

| JP | 07-141812 | 6/1995 |
| JP | 08-45214 | 2/1996 |
| JP | 09-082052 | 3/1997 |
| JP | 10-261249 | 9/1998 |
| WO | WO 00/79523 | 12/2000 |

* cited by examiner

*Primary Examiner*—A. J. Heinz
(74) *Attorney, Agent, or Firm*—McDermott Will & Emery LLP

(57) ABSTRACT

The disclosed suspension assembly (S) for carrying a magnetic recording head in close following relation to a recording disc includes an improved arrangement for supplying a load to the recording head. The suspension assembly (S) includes a flexible gimbal section (10a) for mounting the recording head and accommodating dampened pitch, roll and transverse movements. The head load arrangement comprises a flexible cantilevered spring tongue (10b) and an elongate rigid load member (20) that extends from the free end of the spring tongue to contact the suspension assembly (S) adjacent the recording head. The load member (20) is configured to cause the spring tongue (10b) to resiliently deflect by a predetermined amount, resulting in a predetermined head load being supplied through the load member to the recording head.

45 Claims, 20 Drawing Sheets

FIG. 2
(a)
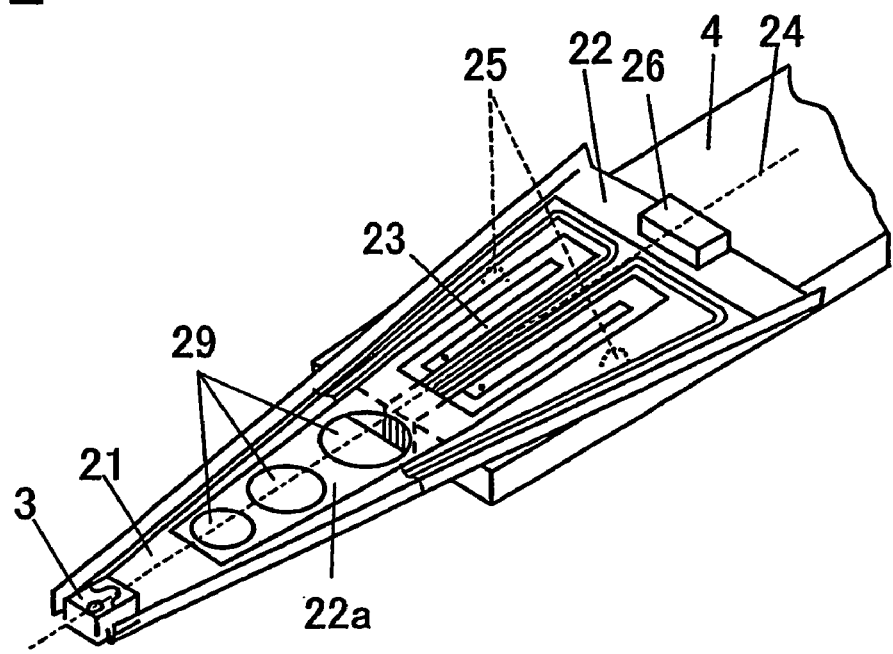
(b)
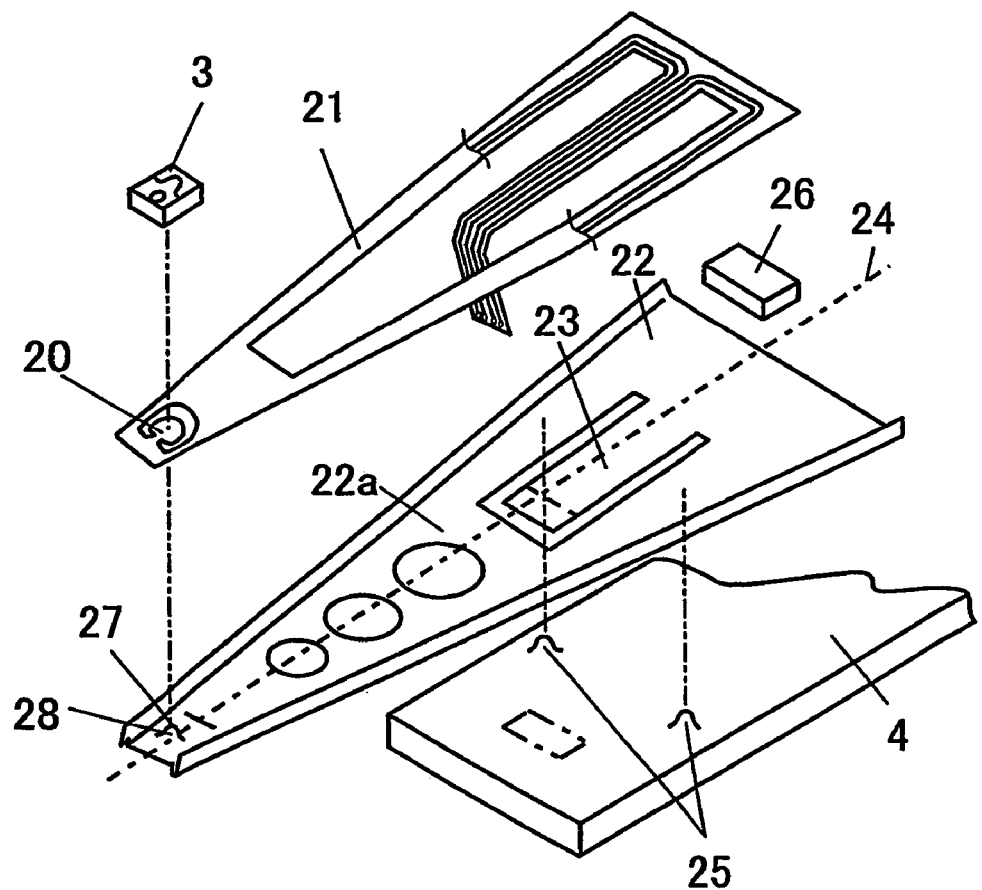

FIG. 6
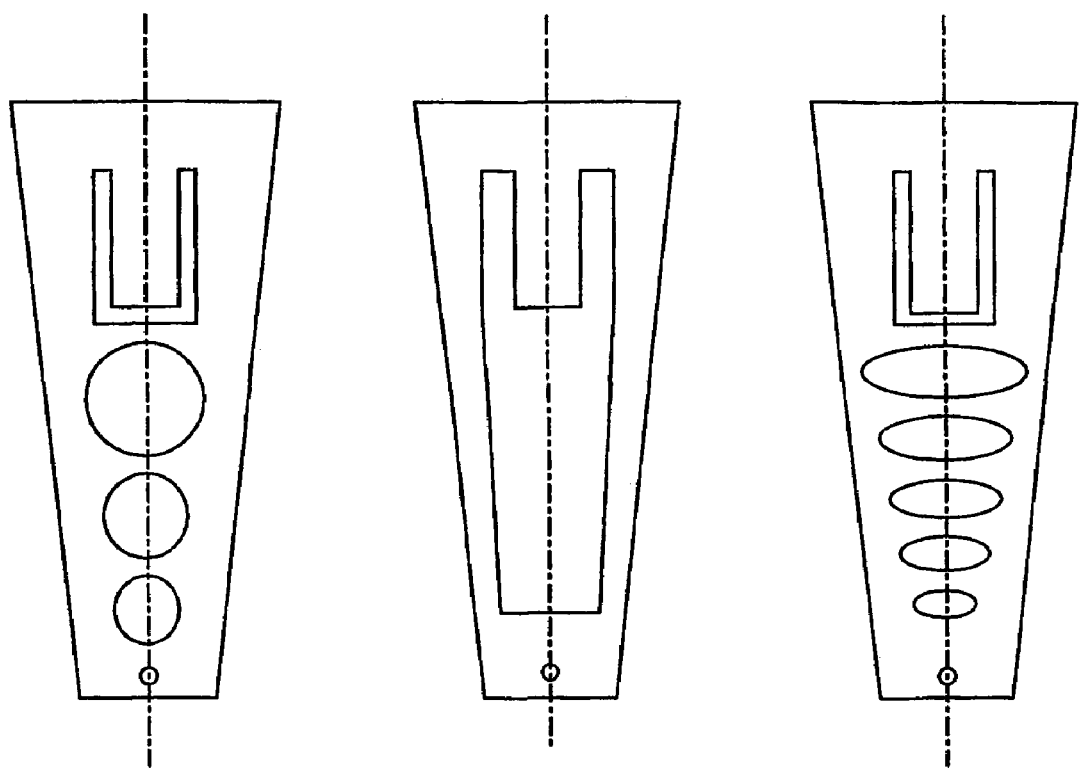
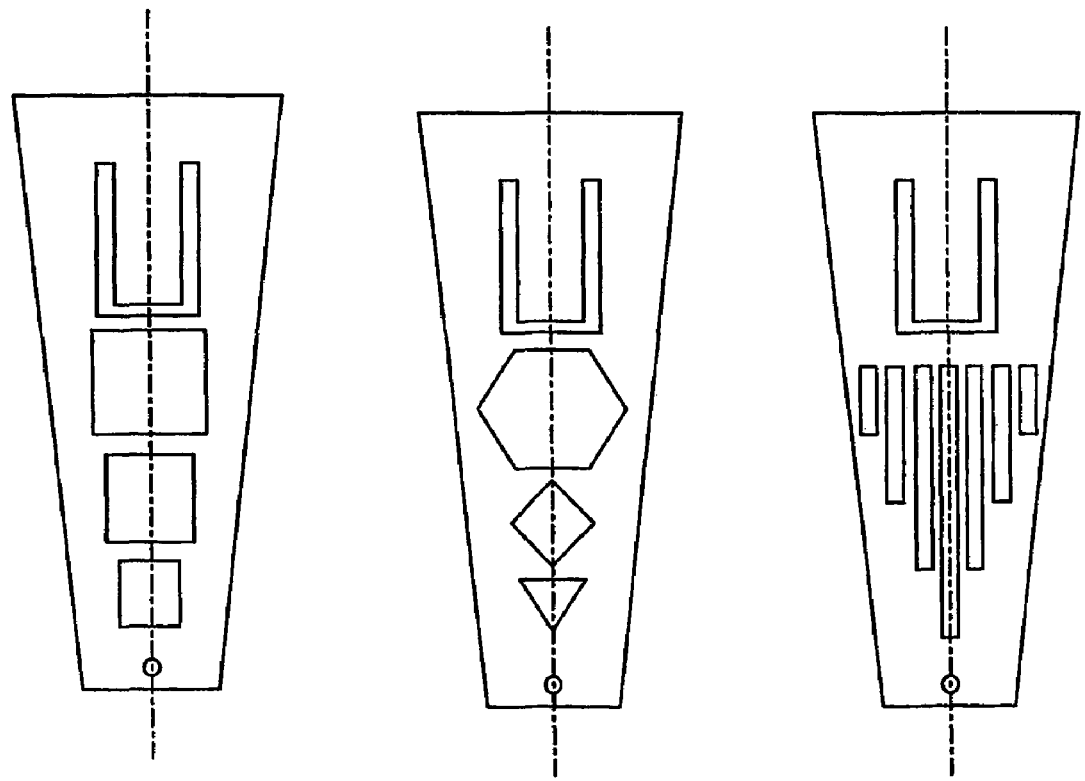

F I G. 7
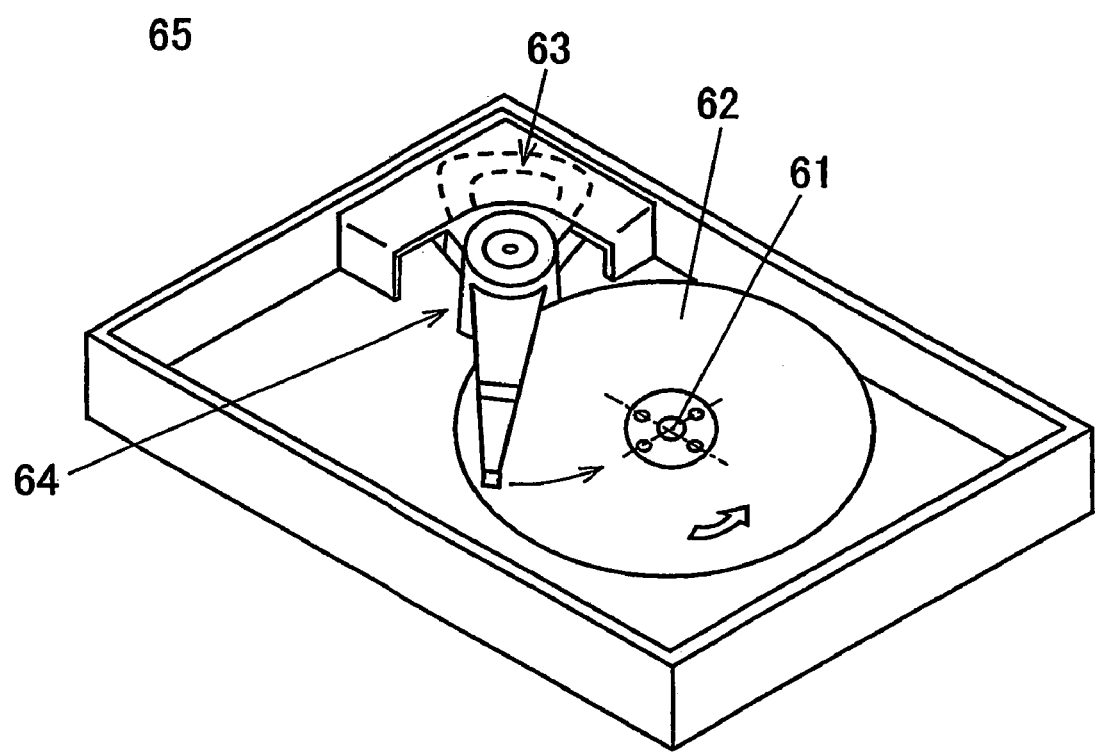

F I G. 8
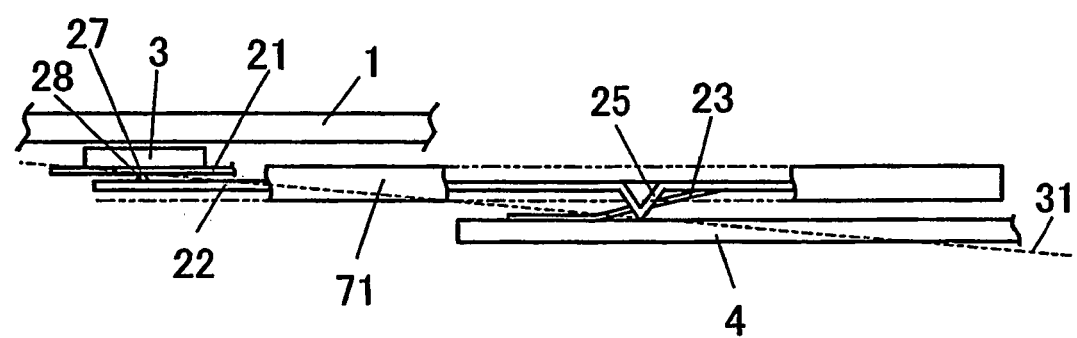

F I G. 9
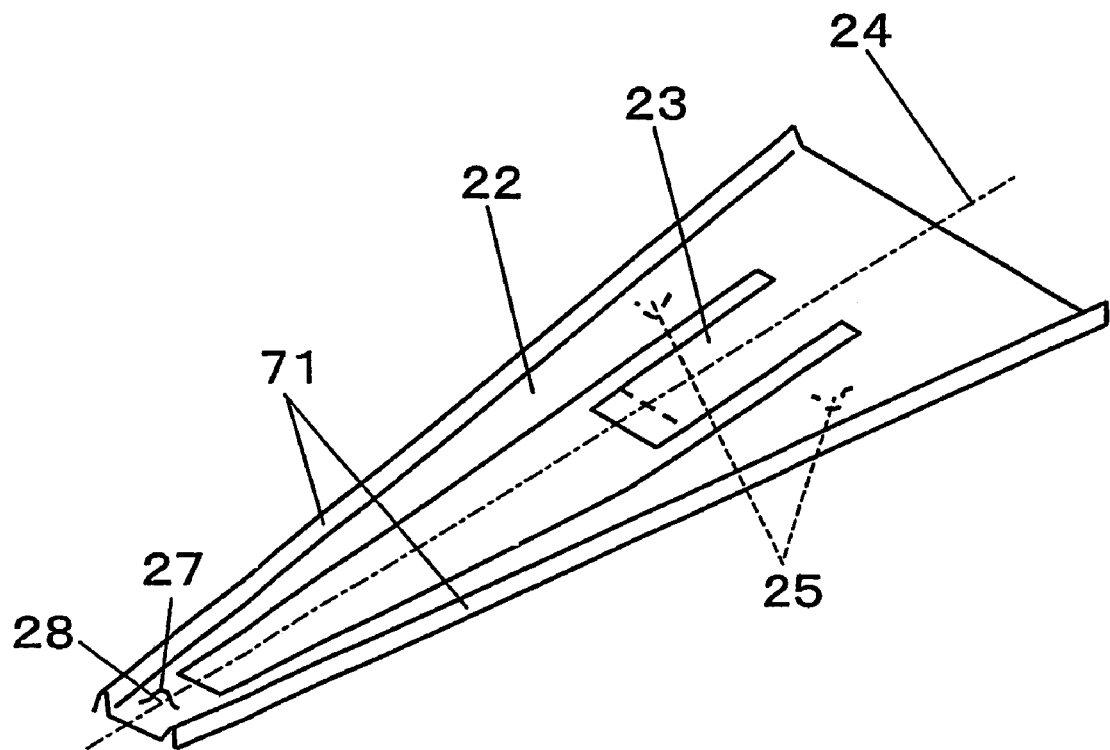

FIG. 10
(a)
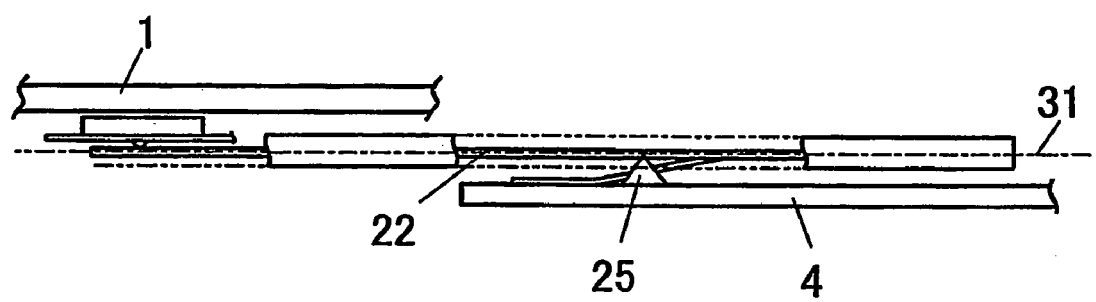
(b)
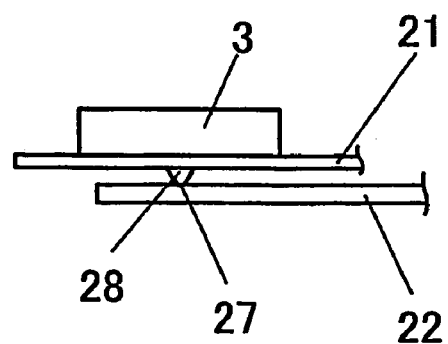

FIG. 12
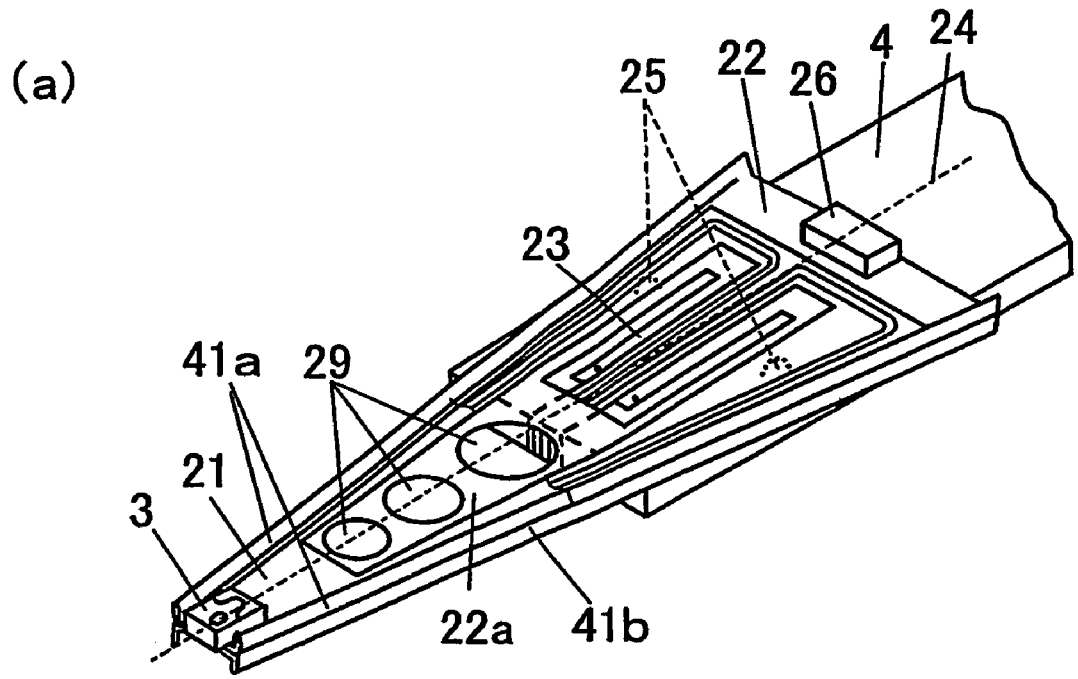
(a)
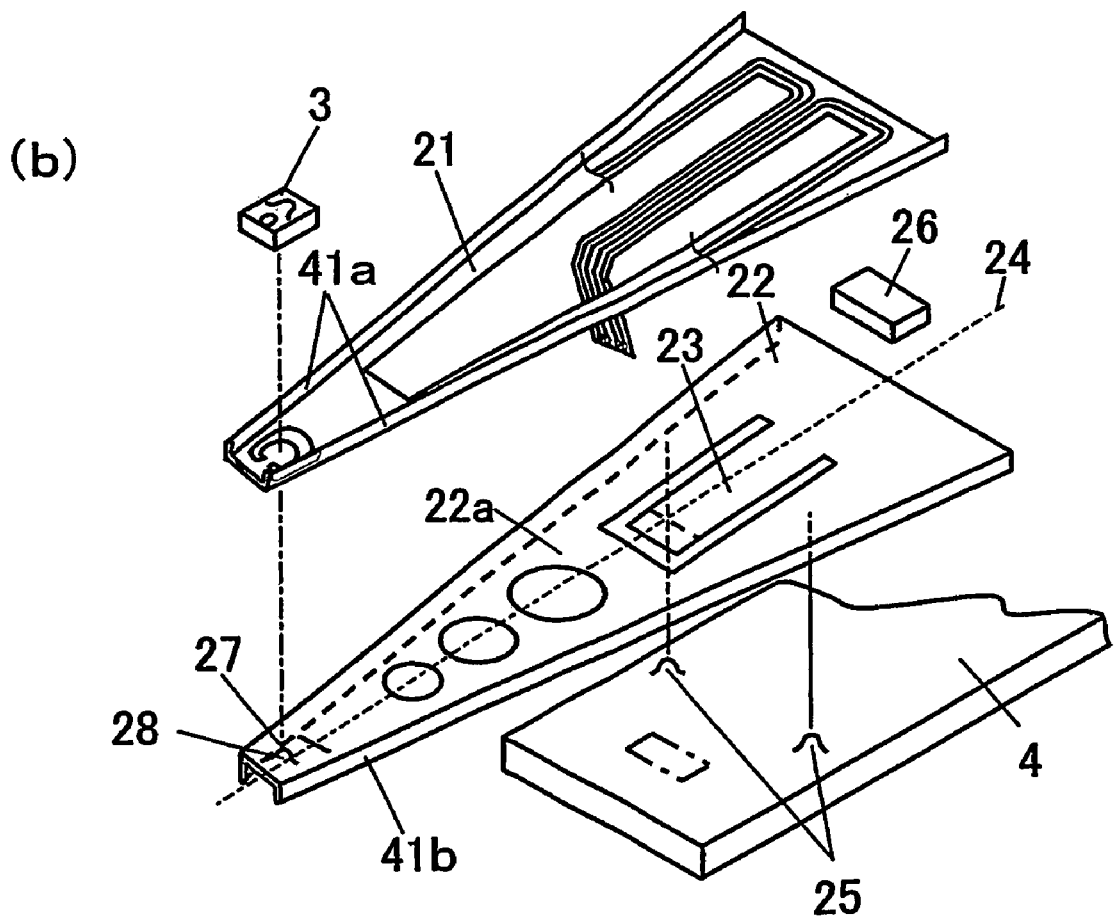
(b)

F I G. 16
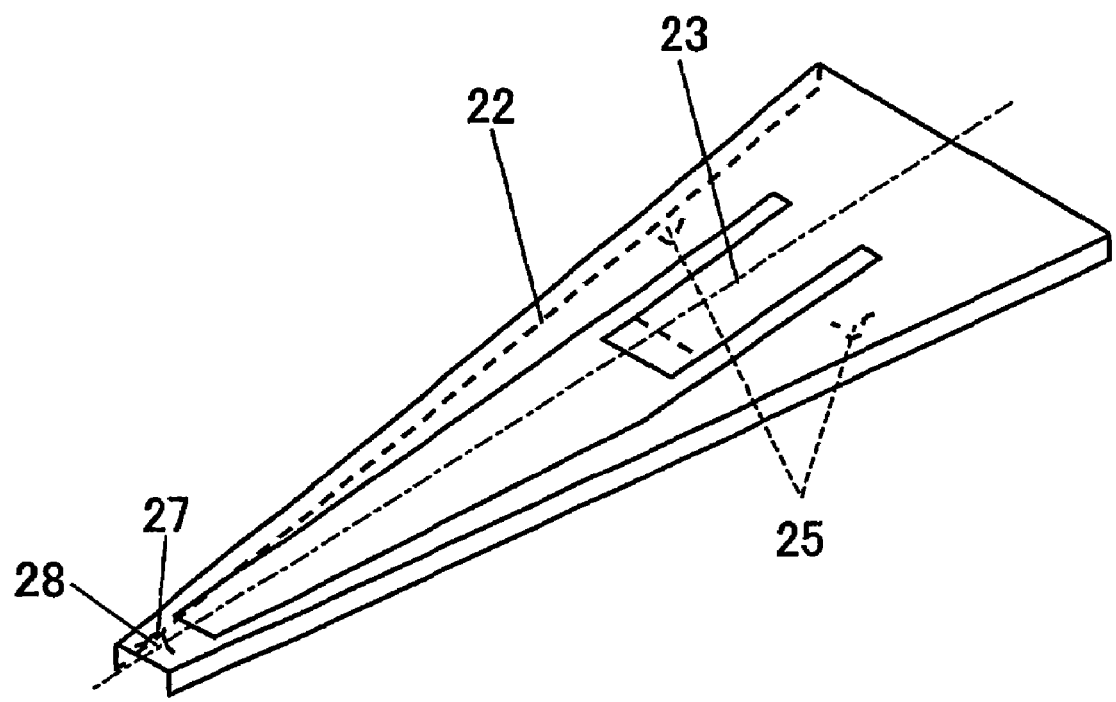

FIG. 17
(a)
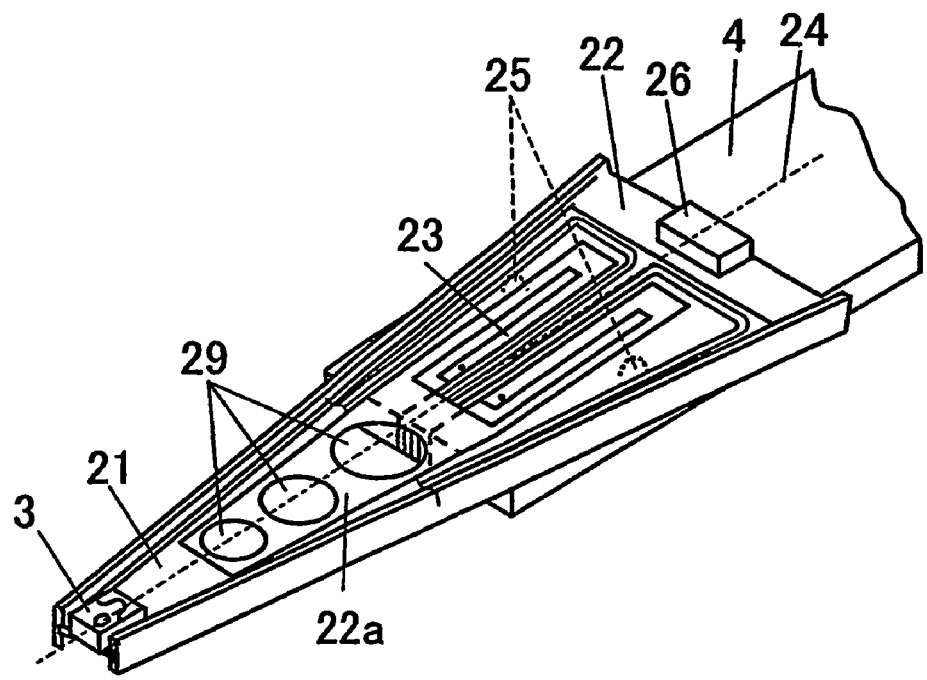
(b)
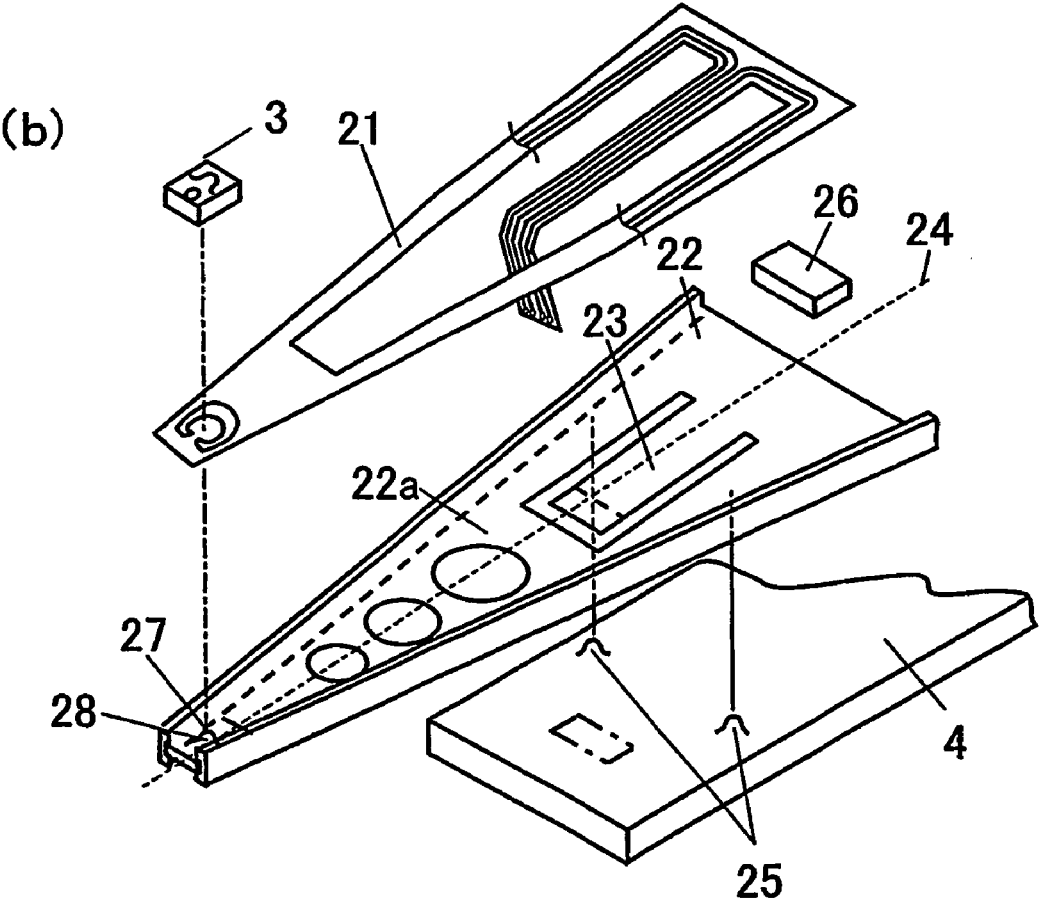

F I G. 1 8
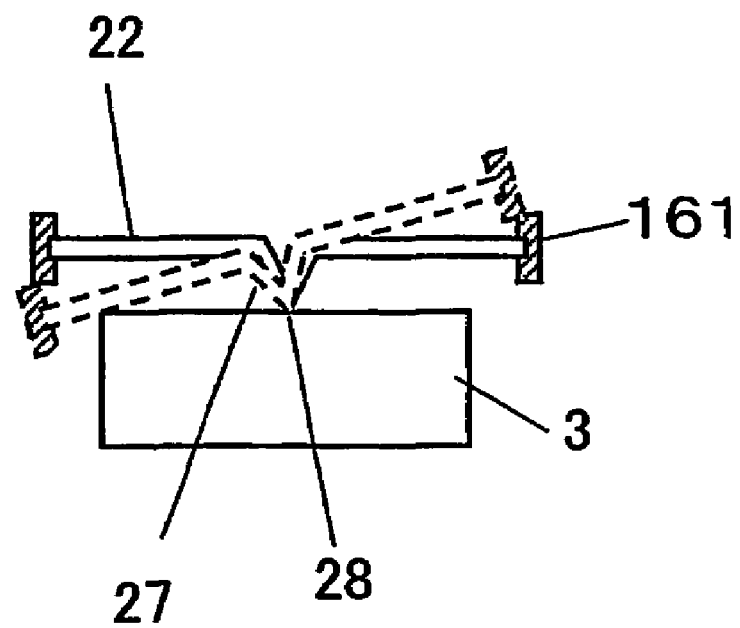

HEAD SUPPORT DEVICE WITH BEARING AND ELASTIC MEMBER

TECHNICAL FIELD

The present invention relates to a head support device used in a disk apparatus having a floating type head, for example, magnetic disk apparatus, optical disk apparatus, and magneto-optical disk apparatus, and a disk apparatus using the same.

BACKGROUND ART

A disk recording and reproducing apparatus (disk apparatus) such as hard disk drive (HDD) is designed to record and reproduce data on a recording surface of a disk as recording medium by means of a head. The HDD has a head support device (also known as head actuator device or carriage device), and the head is supported by it in a floating state with a specified interval above the disk recording surface, and is designed to move in the radial direction above the disk, and such configuration and construction are proposed in various publications (for example, see page 4 of Japanese Patent Laid-open Application No. H9-82052).

As an example of head support device of a conventional disk apparatus having a floating type head, a head support device in a magnetic recording and reproducing apparatus such as HDD is explained by referring to FIG. 19 which is a plan view of structure of essential parts of magnetic recording and reproducing apparatus, and FIG. 20 which is an essential perspective view explaining the structure and action of head support device.

In FIG. 19, a head support device 101 comprises a load beam 102 of relatively low rigidity, an elastic member 103, and a carriage 104 of relatively high rigidity, and a slider 105 mounting a magnetic head (not shown) is provided beneath an end of the load beam 102.

A magnetic recording medium 106 is designed too be rotated by a spindle motor 107, and at the time of recording or reproduction of the magnetic recording and reproducing apparatus, the slider 105 is lifted from the magnetic recording medium 106 by a specified amount, owing to the balancing relation between the buoyancy the slider 105 receives by the air stream generated by rotation of the magnetic recording medium 106 and the thrusting force of the elastic member 103 of the head support device 101 for forcing the slider 105 toward the side of the magnetic recording medium 106, that is, the magnetic head mounted on the slider 105 is lifted from the magnetic recording medium 106 by a specified amount.

At the time of recording or reproduction of the magnetic recording and reproducing apparatus, the head support device 101 is rotated about a second bearing 109 by the action of a voice coil 108 provided at the opposite side of the load beam 102 of the carriage 104, and the magnetic head mounted on the slider 105 is positioned against a desired track of the magnetic recording medium 106, thereby performing recording or reproduction.

Referring further to FIG. 20, the structure and action of the head support device 101 are explained. FIG. 20 is an essential perspective view of the section of the magnetic head in the head support device 101 in FIG. 19.

In FIG. 20, the magnetic head (not shown) is provided at the opposite side of the magnetic recording medium (not shown) of the slider 105 provided at the lower side of one end of the load beam 102. Other end of the load beam 102 is folded, and an elastic member 103 is formed, and the elastic member 103 is stopped at the carriage 104. To suppress changes of load of the slider 105 on the magnetic recording medium due to surface deflection or perpendicular motion of the magnetic recording medium, or manufacturing fluctuations in the distance between the slider 105 and magnetic recording medium at the time of mass production, a notch 111 is provided in the elastic member 103, and the rigidity of the elastic member 103 is lowered, and the spring constant is decreased so as to have a sufficient flexibility.

Besides, torsion and other changes of the carriage and others are also known to have a serious effect on the operation of the head support device, and technologies for decreasing the vibration mode such as distortion have been proposed (for example, see page 6 of Japanese Patent Laid-open Application No. H8-45214). In such specific proposal, by adjusting the bent shape of the spring section (corresponding to the elastic member), and optimally setting the bump (corresponding to the bending size of the spring section) and offset (corresponding to the difference in position height between the connecting portion of the load beam and spring and the portion of connecting the spring section to the carriage), the slider is hardly moved despite linear torsional resonance frequency.

In the head support device of such conventional structure, however, since it is designed to lower the rigidity of the elastic member 103, decrease the spring constant and hence obtain a sufficient flexibility by providing the notch 111 in the elastic member 103 or forming the load beam 102 in a thin plate structure, the resonance frequency declines when the head support device 101 moves the magnetic head to a desired track position at high speed, and vibration mode such as torsion occurs, and consequently off-track may occur, it may take a longer time to settle the vibration mode, and there is a limit for shortening the access time.

Besides, if the bump and offset are set optimally by adjusting the bending shape of the spring section, although it is effective for the linear torsional resonance frequency, enough effect is not obtained for higher torsional resonance frequency. Optimal setting of the bump and offset in the spring section requires adjustment in each head support device in consideration of manufacturing fluctuations of distance between the head arm (corresponding to the carriage) and the disk, and this is not an easy operation, and the number of manufacturing processes is increased.

The speed of moving the magnetic head to a desired track position is becoming faster recently, and hence a very high torsional vibration frequency is provided as torsional vibration mode, and the magnetic head may go off the desired track position owing to the higher torsional vibration mode.

To make the linear torsional mode of the load beam less obvious, the bending shape of the spring section (elastic member) of the load beam is adjusted. However, when the setting height (Z-height) of the load beam is changed, the characteristic is changed, and extra adjustment is needed to obtain a stable performance.

It is hence an object of the invention to solve these problems and present a head support device which is free from effects of manufacturing fluctuations of the distance between the carriage and magnetic recording medium, heightened in rigidity of load beam to have a very large resonance frequency, free from effects of fluctuations of setting height of load beam, stabilized in resonance characteristic, enhanced in the reliability of head positioning control characteristic so as to be free from off-track problem against higher torsional resonance, small in size and light in weight, and excellent in operation stability, and a disk apparatus having such head support device.

DISCLOSURE OF THE INVENTION

To achieve the object, the head support device of the invention has a structure comprising a head, a load beam for supporting the head, a bearing provided between the load beam and a carriage, being rotatable in the perpendicular direction to the recording medium, an elastic member for coupling the load beam and the carriage, and a side reinforcement provided in the load beam. It also has a structure comprising a head, a load beam for supporting the head, a dimple provided in the load beam, a bearing provided between the load beam and a carriage, being rotatable in the perpendicular direction to the recording medium, an elastic member for coupling the load beam and the carriage, and a side reinforcement provided in the load beam. It also has a structure comprising a head, a load beam for supporting the head, a bearing provided between the load beam and a carriage, being rotatable in the perpendicular direction to the recording medium, and an elastic member for coupling the load beam and the carriage, and side reinforcements provided in the load beam, in which an opening is formed in the load beam. In addition to these structures, it further has a structure in which gimbals is provided between the slider and load beam, a structure in which the bearing is provided in the carriage and the peak of the bearing contacts with the load beam, a structure in which the bearing is provided in the load beam and the peak of the bearing contacts with the carriage, a structure in which the elastic member is formed integrally with the load beam, a structure in which the bearing is a pair of pivots, a structure in which the bearing is composed of two pivots, a structure further comprising a second bearing rotatable in the radial direction of the recording medium, in which the carriage is rotatable about the second bearing, a structure in which the load beam is rotatable about the bearing, a structure in which the load beam is forced by the elastic member in a direction perpendicular to the surface of the slider, a structure having a flexure in which the slider is disposed at the end of the load beam, and a structure in which the slider is disposed in the gimbals of the flexure.

In these structures, by rotating the load beam by overcoming the elastic force of the elastic member, the slider can be pressed against the surface of the recording medium by a desired pressing force, and further the rigidity of the load beam is enhanced by the side reinforcement, and the vibration characteristic is improved, thereby obtaining the head support device having the slider moving freely so as to comply with the motion of the surface of the rotating recording medium.

The head support device of the invention further has a structure in which the side reinforcement is provided at both side edges of the load beam. It also has a structure in which the side reinforcement is made of resin. It also has a structure in which the side reinforcement is made of resin, and is disposed in the load beam by integral forming. It also has a structure in which the side reinforcement is formed by bending the both side edges of the load beam. It also has a structure in which the height of the side reinforcement is greater than the thickness of the load beam. It also has a structure in which the sectional shape is formed like letter W in the section perpendicular to the central line in the longitudinal direction of the load beam. It also has a structure in which the sectional shape is formed like letter H in the section perpendicular to the central line in the longitudinal direction of the load beam. It also has a structure in which the entire sectional shape is formed like letter H by gluing a member having a nearly pi-shaped section in the section perpendicular to the central line in the longitudinal direction of the load beam.

In these structures, since the side reinforcement can be formed by an ordinary simple processing method, the rigidity of the load beam can be enhanced without requiring high cost, and the resonance frequency is significantly increased and the resonance characteristic can be stabilized, thereby obtaining the head support device applicable to high access speed without off-track problem despite higher torsional resonance.

The head support device of the invention moreover has a structure in which the bearing is composed of two pivots, and the side reinforcement is formed in a flat plane of the load beam, perpendicular to the line linking the middle point of the two pivots and the peak of the dimple, with the shearing center of the section of the load beam passing through the peak of the dimple coinciding with the peak of the dimple. It also has a structure in which the bearing is composed of two pivots, and the dimple provided in the load beam has the peak located on the perpendicular bisector of the line linking the peaks of the both pivots. It also has a structure in which the bearing is composed of two pivots, perpendicular to the centerline in the longitudinal direction of the load beam, and the side reinforcement is formed, with the centroid at the position of center of gravity of the load beam passing through the peak of the dimple coinciding with the peak of the dimple provided in the load beam. It also has a structure in which the centroid at the position of the center of gravity at a section perpendicular to the centerline in the longitudinal direction of the load beam is positioned on the plane passing through two pivots and the peak of the dimple provided in the load beam, and the side reinforcement is formed at both side edges of the load beam. It also has a structure in which the centroid at the position of the center of gravity at a section perpendicular to the centerline in the longitudinal direction of the load beam is positioned on the line linking the middle point of the line linking the peaks of the two pivots and the peak of the dimple provided in the load beam, and the side reinforcement is formed at both side edges of the load beam.

In these structures, in spite of the impact from outside or torsional vibration when moving the magnetic head to the target track, the rigidity of the load beam is increased and the resonance frequency characteristic is enhanced, and the position of the peak of the dimple is not moved despite higher torsional resonance frequency, and hence off-track problem is not caused, thereby obtaining the head support device applicable to high access speed.

The head support device of the invention moreover has a structure comprising a head, a load beam for supporting the head, a dimple provided in the load beam, a bearing provided between the load beam and a carriage, and an elastic member for coupling the load beam and the carriage, in which the load beam has an opening. In addition, it also has a structure in which the opening is provided in the center of the load beam, a structure in which the opening is formed symmetrically to the centerline of the load beam, a structure in which the opening is formed in a circular form, elliptical form, or polygonal form, a structure in which the opening is formed in a slit shape, a structure in which the end portion of the opening is provided closely to the side reinforcement, and a structure in which at least two openings are provided, and each opening is formed at a symmetrical position to the centerline of the load beam.

In these structures, by rotating the load beam by overcoming the elastic force of the elastic member made of spring or the like, the slider can be pressed against the surface of the recording medium by a desired pressing force, and further the slider can be moved freely along the motion of the surface of the rotating recording medium, the weight and size are reduced by forming the opening in the side surface, and thereby the head support device capable of adjusting the resonance characteristic of the load beam from other side can be obtained.

Moreover, the head support device of the invention moreover has a structure in which the bearing is composed of two pivots, and a balancer is provided in the load beam so that the direction of action of total center of gravity in the direction of the recording medium of the flexure having the slider, rotating parts of the load beam and the balancer may pass the axis of rotation linking each peak of the pivots. In this structure, without receiving effects of impact force from outside, a head support device of high reliability without damage of slider and magnetic recording medium due to collision can be realized.

The disk apparatus of the invention has a structure comprising a recording medium, a head, a load beam for supporting the head, a bearing provided between the load beam and a carriage, being rotatable in the perpendicular direction to the recording medium, an elastic member for coupling the load beam and the carriage, and a side reinforcement provided in the load beam. It also has a structure comprising a recording medium, a head, a load beam for supporting the head, a dimple provided in the load beam, a bearing provided between the load beam and a carriage, being rotatable in the perpendicular direction to the recording medium, and an elastic member for coupling the load beam and the carriage, in which an opening is provided in the load beam. In addition to these structures, it also has a structure in which gimbals is provided between the slider and load beam, a structure in which the bearing is provided in the carriage and the peak of the bearing contacts with the load beam, a structure in which the bearing is provided in the load beam and the peak of the bearing contacts with the carriage, a structure in which the elastic member is formed integrally with the load beam, a structure in which the bearing is a pair of pivots, a structure in which the bearing is composed of two pivots, a structure further comprising a second bearing rotatable in the radial direction of the recording medium, in which the carriage is rotatable about the second bearing, a structure in which the load beam is rotatable about the bearing, and a structure in which the load beam is forced by the elastic member in a direction perpendicular to the surface of the slider.

In these structures, the head can be moved to a desired track position at high speed, and the disk apparatus of high reliability substantially shortened in the access time can be realized.

BRIEF DESCRIPTION OF THE DRAWINGS

FIG. 2(a) is a perspective view of essential parts showing a schematic structure of head support device in preferred embodiment 1 of the invention.

FIG. 2(b) is a perspective exploded view of essential parts showing a schematic structure of head support device in preferred embodiment 1 of the invention.

FIG. 6 is a plan view showing an example of shape and configuration of opening provided in the plane of the load beam in head support device in preferred embodiment 1 of the invention.

FIG. 7 is a perspective view showing a structure of disk apparatus having the head support device in preferred embodiment 1 of the invention.

FIG. 8 is a partially cut-away side view of head support device in preferred embodiment 2 of the invention.

FIG. 9 is a perspective view of load beam as seen from the slider mounting side of head support device in preferred embodiment 2 of the invention.

FIG. 10(a) is a cut-away side view of essential parts of head support device in preferred embodiment 3 of the invention.

FIG. 10(b) is a partially magnified side view of essential parts of head support device in FIG. 10(a).

FIG. 12(a) is a perspective view of essential parts showing a schematic structure of head support device in preferred embodiment 4 of the invention.

FIG. 12(b) is a perspective exploded view of essential parts showing a schematic structure of head support device in preferred embodiment 4 of the invention.

FIG. 16 is a perspective view of load beam as seen from the slider mounting side of other head support device in preferred embodiment 4 of the invention.

FIG. 17(a) is a perspective view of essential parts showing a schematic structure of head support device in preferred embodiment 5 of the invention.

FIG. 17(b) is a perspective exploded view of essential parts showing a schematic structure of head support device in preferred embodiment 5 of the invention.

FIG. 18 is a sectional view of load beam cut off at a plane passing through the dimple peak of head support device in preferred embodiment 5 of the invention.

DETAILED DESCRIPTION OF PREFERRED EMBODIMENTS

Preferred preferred embodiments of the invention are described below while referring to the accompanying drawings.

Preferred Embodiment 1

Figure 1:
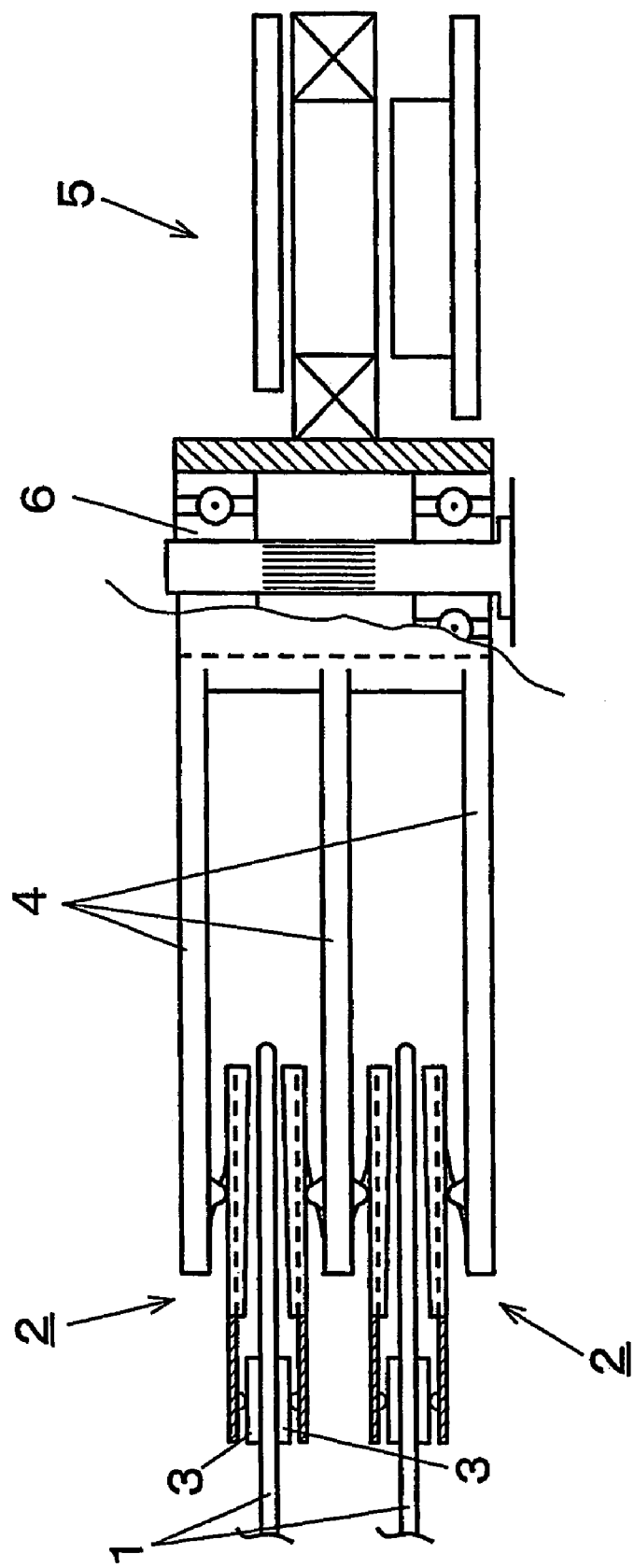
FIG. 1 is a side view showing part of head support device of disk apparatus in preferred embodiment 1 of the invention.
Figure 3:
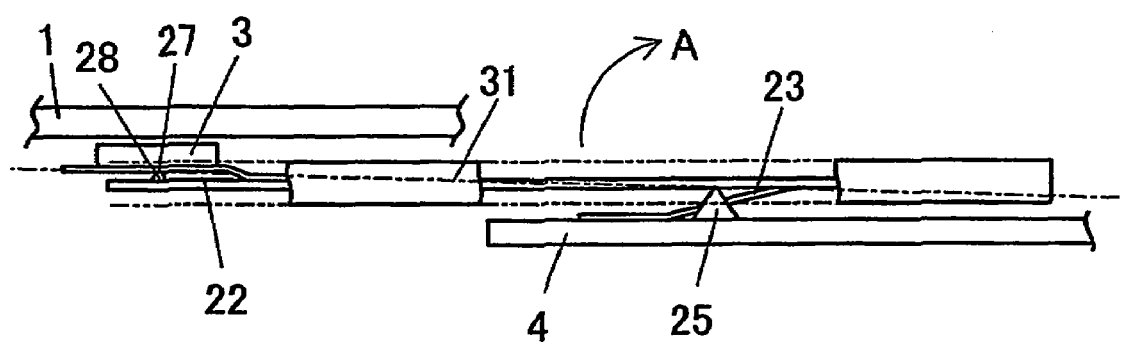
FIG. 3 is a partially cut-away side view of head support device in preferred embodiment 1 of the invention.

FIG. 1, FIG. 2 and FIG. 3 are drawings for explaining the head support device of disk apparatus in preferred embodiment 1 of the invention. A magnetic recording and reproducing apparatus is explained below as an example of disk apparatus. FIG. 1 is a side view showing the head support device having a floating type head of disk apparatus used in computer storage or the like together with part of disk such as magnetic recording medium. FIG. 2(a) is a perspective view of essential parts showing a schematic structure of head support device of the invention, and FIG. 2(b) is a perspective exploded view of essential parts showing a schematic structure of head support device of the invention. FIG. 3 is a partially cut-away side view of essential parts of head support device of the invention.

In FIG. 1, to be opposite to magnetic recording medium layers formed on both upper and lower sides of a plurality of magnetic recording media 1, magnetic heads (not shown) mounted on a slider 3 of a plurality of head support devices 2 are composed. At the time of recording or reproduction of the magnetic recording and reproducing apparatus, by the action of driving means such as voice coil, provided in the carriage 4, the magnetic head mounted on the slider 3 is rotated about the center of rotation of a second bearing 6 in the radial direction of the magnetic recording medium 1, and is positioned at a desired track of the magnetic recording medium 1. As the driving means 5, a voice coil motor is used, but it is not limited to voice coil motor, but linear motor or other driving means may be employed. In the following explanation, as shown in FIG. 3, the head support device 2 disposed to be opposite to the lower side of the magnetic recording medium 1 is described.

In FIG. 1, two magnetic recording media 1 are shown, but the same effects are obtained by using one magnetic recording medium or three or more magnetic recording media. In the explanation, both upper and lower sides of the magnetic recording media are used, but the same effects are obtained by a structure having one head support device corresponding to one side of the magnetic recording medium only. In FIG. 2 and FIG. 3, the slider 3 mounting a magnetic head (not shown) at one end is disposed, an elastic member 23 such as plate spring is formed in part of a load beam 22 to which a flexure 21 having gimbals 20 integrally forming a thin metal plate such as SUS and a flexible wiring board is adhered, and an open end of the elastic member 23 is affixed to a carriage 4 by known method such as spot welding method, ultrasonic welding method, or laser welding method. The elastic member 23 may be composed of a different elastic member from the load beam 22, and when a different elastic member is used, one end of the elastic member is affixed to the load beam 22 and the other end to the carriage 4 by similar known welding method. The carriage 4 has a pair of (two) pivots 25 provided at right and left symmetrical positions of a centerline 24 in the longitudinal direction of the load beam 22 (by the pivots 25, the load beam 22 can be rotated in a direction perpendicular to the magnetic recording medium 1). Therefore, by overcoming the elastic force of the elastic member 23 such as plate spring of the load beam 22 affixed to the carriage 4, the rotary portion (the portion excluding the elastic member 23) of the load beam 22 is pushed up so as to rotate in the direction of arrow A in FIG. 3 about the two pivots 25, and the slider 3 disposed on the load beam 22 is forced to the side of the magnetic recording medium 1 so that the slider 3 may press the surface of the magnetic recording medium 1 (not shown in FIG. 2). A balancer 26 (not shown in FIG. 2) is affixed to the other end of the load beam 22 (the end of the opposite side of the slider 3 side), and the total center of gravity in the direction of the magnetic recording medium 1 of the rotary portion of the load beam 22, the flexure 21 having the slider 3 and the balancer 26 is linked to the peaks of the two pivots 25 of the carriage 4, and this linking line is the axis of rotation, and it is formed on a plane perpendicular to the magnetic recording medium 1 including this axis of rotation. By using such balancer 26, if receiving an impulse force by impact from outside or the like, there is no force acting to rotate the load beam 22 about the axis of rotation linking the peaks of the two pivots 25 of the carriage 4, and hence the slider 3 does not collide against and damage the surface of the magnetic recording medium 1, so that the reliability may be enhanced.

On the surface facing the slider 3 of the load beam 22, further, there is a dimple 28 having a peak 27 on a face perpendicular to the plane 22a of the load beam 22 including the centerline 24 in its longitudinal direction, and at the peak 27, the load beam 22 oscillatably supporting the slider 3 is connected by way of the flexure 21. By the peak 27 of the dimple 28, the load beam 22 and the slider 3 contact with each other directly or by way of the flexure 21, and the slider 3 can move freely along the rotating motion of the surface of the magnetic recording medium 1. The centerline 24 in the longitudinal direction of the load beam 22 is set so as to pass through the center of rotation rotated by the action of the voice coil (not shown) as the driving means having the load beam 22 provided on the carriage 4 or the like. The peak 27 of the dimple 28 may be designed to contact with the slider 3 directly, instead of supporting the slider 3 by way of the flexure 21.

Figure 4:
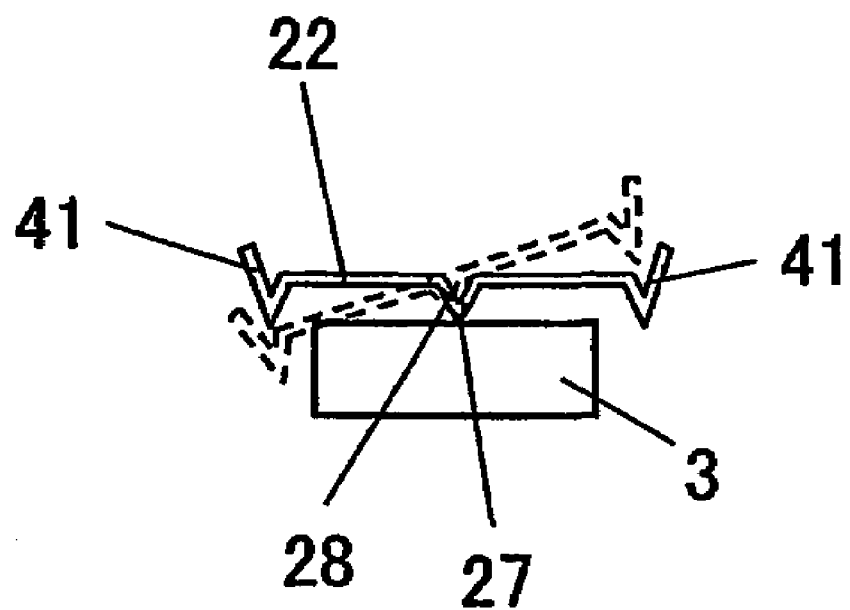
FIG. 4 is a sectional view of load beam showing a plan section passing the peak of dimple in head support device in preferred embodiment 1 of the invention.

FIG. 4 is a sectional view of load beam 22 seen on a section perpendicular to the centerline 24 in FIG. 2(a) and at a plane passing through the peak 27 of the dimple 28. As shown in FIG. 4, a side reinforcement 41 is formed almost on the whole surface at the right and left sides of the load beam 22. In FIG. 4, a V-section is formed at right and left sides of the load beam 22, and the side reinforcement 41 is shown in a W-section on the whole. Not limited to the W-section, the side reinforcement 41 may be formed in any other shape, but it is desired to be shaped by bending process. Or other member may be formed integrally. Instead of forming on the entire surface, the side reinforcement 41 may be formed in part, in the portion up to the opposite side periphery of the end portion of the slider 3 side of the elastic member 23 of plate spring or the like at least from the slider 3 side end portion.

Since the side reinforcement 41 is also present near the elastic member 23 of plate spring or the like, the rigidity of the load beam 22 is increased, and vertical swing in the direction of the magnetic recording medium 1 of the load beam 22 due to impact or vibration, lateral swing along the surface of the magnetic recording medium 1, or swing due to torsion can be suppressed, and the load beam 22 can be composed of a thin plate, so that lighter weight and smaller size may be realized.

Figure 5:
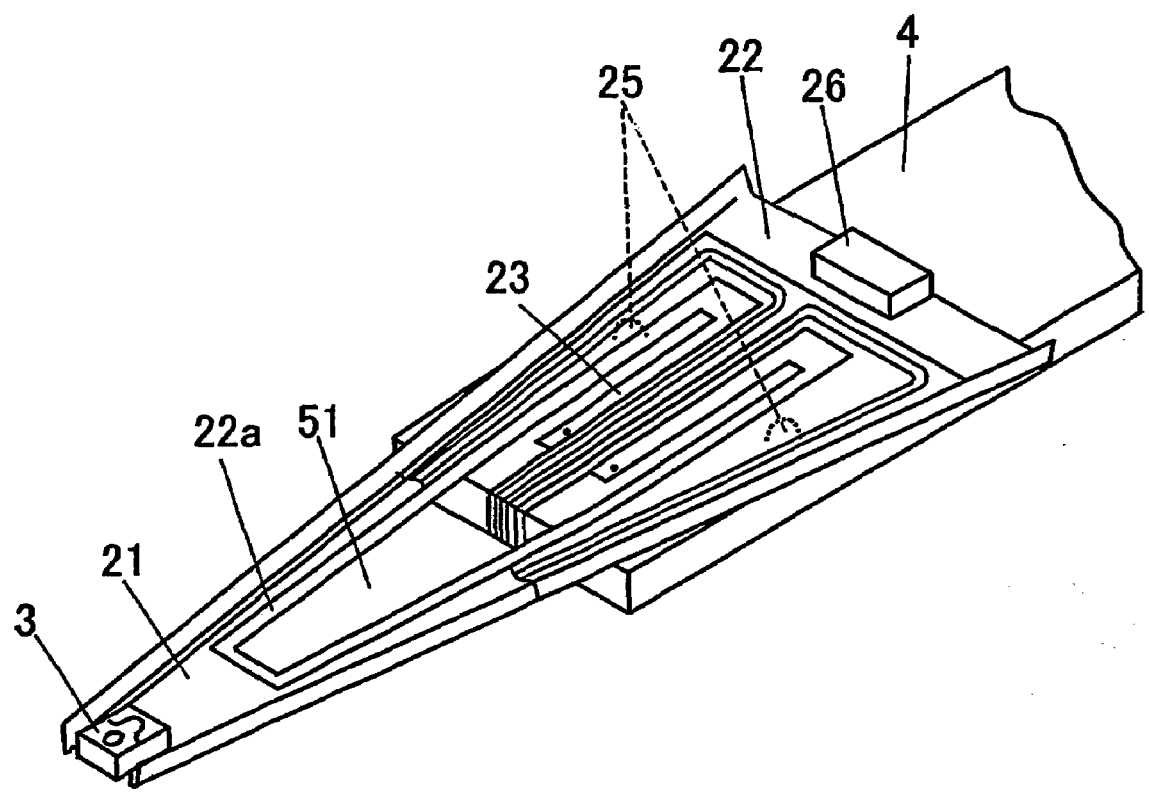
FIG. 5 is a perspective view showing other example of load beam in head support device in preferred embodiment 1 of the invention.

Besides, by forming the side reinforcement 41, the rigidity of the load beam 22 is increased substantially, and therefore as shown in a perspective view of schematic structure of the essential parts of the head support device in FIG. 2(a), an opening 29 composed of a plurality of holes may be provided in the plane 22a of the load beam 22, or as shown in FIG. 5, an opening 51 of a hole in the longitudinal direction may be provided in the center of the plane 22a of the load beam 22, thereby reducing the weight, and further the resonance characteristic of the load beam 22 can be adjusted. FIG. 2(a) shows an example of disposing the opening 29 along the centerline 24 by forming three circles different in diameter in the plane 22a of the load beam 22, but the opening 29 formed in the load beam 22 composing the head support device in preferred embodiment 1 of the invention is not limited to this structure alone. The opening 29 may be formed in elliptical or polygonal shape instead of circular shape, or a plurality of different shapes, instead of same shape, may be combined. The size of the opening 29 can be set freely so as to be formed in the plane 22a of the load beam 22, and the end portion of the opening 29 may be provided near the side reinforcement 41. Further, the opening 29 may be formed in a fine louver shape, and the load beam 22 may be formed therein. However, the opening 29 is preferred to be formed in a symmetrical shape or symmetrical configuration to the centerline 24 of the load beam 22.

Thus, by disposing the opening 29 in the plane 22a of the load beam 22, the load beam 22 can be reduced in weight and size same as in the case of composition of a thin plate. Further, in the load beam 22 made of thin plate, the opening 29 can be also provided in the plane 22a of the load beam 22. The shape, number, and configuration of the openings 29 and the plate thickness of the load beam 22 may be properly selected in combination in consideration of the rigidity of the load beam 22. FIG. 6 is a plan view of a typical example of opening formed in the load beam.

When the head support device 2 moves the magnetic head to a desired track position at high speed, as the speed is higher, torsional vibration is more likely to occur in the load beam 22. At this time, if torsional vibration occurs in the load beam 22, as far as the relative positions of the slider 3 and the peak 27 of the dimple 28 of the load beam 22 contacting therewith are invariable, off-track trouble does not occur due to the torsional vibration when moving the magnetic head to the desired track position at high speed, and the access time to the desired track position can be shortened. To realize such configuration, the position of the peak 27 of the dimple 28 of the load beam 22 is required to coincide with the neutral axis of torsion of the load beam 22.

At this time, as far as the shape of the section of the load beam 22 cut off by a plane perpendicular to the centerline 24 in FIG. 2(a) and passing through the peak 27 of the dimple 28 is symmetrical to the centerline 24 both vertically and laterally, it is present on the plane passing three points, that is, the peaks of two pivots 25 of the carriage 4 and the peak 27 of the dimple 28 of the load beam 22, and a line 31 (see FIG. 3) at right angle to the line linking the peaks of the two pivots 25 and passing the middle point coincides with the neutral axis of torsion of the load beam 22. For this purpose, the shape of the side reinforcement 41 in the individual portions of the load beam 22 should be set so that the centroid of the section of the load beam 22 shown ion FIG. 4 and the section of the load beam 22 parallel to this section may be present on the line 31. In other words, when the shape of the section of the load beam 22 is symmetrical to the centerline 24 both vertically and laterally, in the event of torsional resonance of the load beam 22, it is enough to consider the stress due to torsional moment only, and it is enough to match the centroid at the position where the stress is zero and the position of the peak 27 of the dimple 28 of the load beam 22.

In the load beam 22 of the head support device in preferred embodiment 1 of the invention, however, on the plane perpendicular to the centerline 24 in FIG. 2(a) and passing the peak 27 of the dimple 28, as shown in a sectional view in FIG. 4, the load beam 22 has the side reinforcement 41 in a V-section at right and left sides and a W-section on the whole. This load beam 22 is symmetrical to the centerline 24 laterally, but is not symmetrical in the vertical direction, and therefore the position of the peak 27 of the dimple 28 cannot be discussed in terms of the centroid at the section of the load beam 22.

In this case, lacking symmetry in the vertical direction, the position where the combined stress of the shearing stresses caused by torsional vibration is zero must be matched with the position of the peak 27 of the dimple 28 of the load beam 22, and this position must be matched with the neutral axis of torsion of the load beam 22.

Such point of zero combined stress of shearing stresses due to torsional vibration is called the center of shearing in the field of mechanical engineering. Therefore, if not symmetrical on the plane perpendicular to the centerline 24 of the load beam 22 and passing the peak 27 of the dimple 28 in a sectional view, by matching the position of the peak 27 of the dimple 28 with the center of shearing, it coincides with the neutral axis of torsion of the load beam 22, and hence when moving the magnetic head to the desired track position at a high speed, the relative positions of the slider 3 and the peak 27 of the dimple 28 of the load beam 22 contacting therewith are invariable, and off-track does not occur due to torsional vibration.

Therefore, in the case of the load beam 22 symmetrical laterally but not symmetrical vertically, having the side reinforcement 41 formed in V-section on right and left side and W-section on the whole, the shape of the side reinforcement 41 in each portion of the load beam 22 should be set so that the center of shearing of the section of the load beam 22 shown in FIG. 4 and the section of the load beam 22 parallel to this section may be present on the plane passing three points, that is, the peaks of two pivots 25 of the carriage 4 and the peak 27 of the dimple 28 of the load beam 22, and on the line 31 at right angle to the line linking the peaks of the two pivots 25 and passing the middle point. Accordingly, the peak 27 of the dimple 28 coincides with the neutral axis of torsion of the load beam 22.

In the load beam 22 having thus designed side reinforcement 41, since the peak 27 of the dimple 28 coincides with the neutral axis of torsion of the load beam 22, if the peak 27 of the dimple 28 of the load beam 22 is subject to torsional vibration as indicated by broken line in FIG. 4, the slider 3 having the magnetic head is not moved, and off-track does not occur if the magnetic head is moved to the desired track position at high speed, so that the access time to the desired track position can be shortened.

Instead of setting the shape of the side reinforcement 41 in all portions of the load beam 22 so that the center of shearing of all sections of the load beam 22 may be located on the line 31, by setting the shape of the side reinforcement 41 so that the center of shearing of each section near the dimple 28 of the loading beam 22 may be located on the line 31, and that the center of shearing of each section may be gradually departed from the line 31 as being going apart from the vicinity of the dimple 28 of the load beam 22 toward the elastic member 23 of the load beam 22, the off-track amount by torsional vibration is very small, and there is no practical problem, and thereby the access time to the desired track position can be shortened.

In the explanation of the head support device 2 in preferred embodiment 1 of the invention, the load beam 22 has the side reinforcement 41 having a V-section at right and left sides of the load beam 22, and a W-section on the whole, and it is symmetrical laterally but not symmetrical vertically, and the dimple 28 having the peak 27 is formed in the plane perpendicular to the plane 22a of the load beam 22 including the centerline 24 in its longitudinal direction, and the position of the peak 27 coincides on the perpendicular bisector of the line linking the peaks of the both pivots 25 at the neutral axis (line 31) of torsion, but the invention is not limited to this example alone, and the position of the peak 27 of the dimple 28 may be anywhere capable of forming the dimple 28 on the plane 22a of the load beam 22, and may be set at any position coinciding with the section of the load beam 22 and the center of shearing of each section parallel to the section. At this time, the neutral position of torsion is present on a plane passing the peaks of the two pivots 25 and the peak 27 of the dimple 28, and coincides with the line 31 passing the middle point linking the peaks of the two pivots 25 and the peak 27 of the dimple 28. Further, the line 31 is not required to be a straight line, but may be a moderate curve. In this case, needless to say, at least the section of the load beam 22 is not symmetrical to the centerline 24 in its longitudinal direction. At this time, however, the center of shearing of the section of the load beam 22 and each section parallel to this section is present on the plane passing three points, that is, the peaks of two pivots 25 of the carriage 4 and the peak 27 of the dimple 28 of the load beam 22, and on the line 31 passing the middle point of the line linking the peaks of the two pivots 25, but the line 31 is not perpendicular bisector linking the peaks of the two pivots 25. In this case, too, the peak 27 of the dimple 28 can be matched with the neutral axis of torsion of the load beam 22.

Moreover, by the side reinforcement 41, the rigidity of the load beam 22 is substantially increased, and further by matching the position of the peak 27 of the dimple 28 of the load beam 22 with the neutral axis of torsion of the load beam 22, if fluctuation occurs in the distance between the carriage 4 and magnetic recording medium 1, that is, in the setting height of the load beam 22 due to manufacturing fluctuations, the resonance characteristic of the load beam 22 can be stabilized and higher resonance of torsion can be decreased in spite of impact, vibration, or vibration due to seek action of moving the magnetic head to the desired track, so that off-track occurs hardly, in other words, effects of fluctuations of setting height of the load beam 22 can be eliminated.

The head support device 2 having such configuration can be applied, needless to say, in all head support devices including the head support device opposite to the upper side of the magnetic recording medium 1, and moreover, as shown in FIG. 7, by applying in a magnetic recording and reproducing apparatus 65 having a head support device 64 rotated in the radial direction by the action of a voice coil 63, on a magnetic recording medium 62 rotated and driven by a spindle motor 61, the magnetic head can be moved to a desired track position at high speed, and the magnetic recording and reproducing apparatus 65 substantially shortened in the access time is realized.

Thus, according to preferred embodiment 1, if the setting height of the load beam fluctuates, the resonance characteristic of the load beam can be stabilized, and the position of the slider is not changed in spite of torsional vibration, and the head positioning control characteristic is improved, and also the access time of moving the magnetic head to the desired track can be shortened.

Still more, by reinforcing the rigidity of the load beam by composing the side reinforcement along the elastic member composed of plate spring, an opening made of holes can be provided in the load beam, or the load beam can be made of a thin plate, so that the head support device reduced in weight and size can be realized.

By mounting such head support device, a disk apparatus enhanced in the head positioning control characteristic, capable of moving the magnetic head to the desired track position at high speed, and significantly shortened in the access time can be realized.

In the above explanation, the peak of the pivot 25 is a point, but not limited to a point, the load beam may be rotated by forming in wedge form or other axial line.

Preferred Embodiment 2

FIG. 8 and FIG. 9 are diagrams explaining the head support device in preferred embodiment 2 of the invention, and FIG. 8 is a sectional view showing essential parts of the head support device in a cut-away view, and FIG. 9 is a perspective view of load beam as seen from the slider mounting side. In FIG. 8 and FIG. 9, same constituent elements as in preferred embodiment 1 shown in FIG. 2(a) and FIG. 3 are identified with same reference numerals as in FIG. 2(a) and FIG. 3. Same as in preferred embodiment 1, the magnetic recording and reproducing apparatus is explained as the disk apparatus. What preferred embodiment 2 differs from preferred embodiment 1 is that two pivots are not formed in the carriage, but are formed at right and left symmetrical positions across the centerline in the longitudinal direction of the load beam.

In FIG. 8 and FIG. 9, an elastic member 23 made of plate spring or the like is formed in part of a load beam 22 having a flexure 21 disposing a slider 3 mounting a magnetic head (not shown) affixed at one end, and the open end of the elastic member 23 is affixed to a carriage 4 in a known method same as in preferred embodiment 1. The elastic member 23 may be made of a separate member from the load beam 22 same as in preferred embodiment 1. Two pivots 25 are provided in the load beam 22 at right and left symmetrical positions across the centerline 24 in its longitudinal direction, and the slider 3 disposed in the load beam 22 pushes up the load beam 22 by pressing the surface of a magnetic recording medium 1 by overcoming the elastic force of the elastic member 23 of the load beam 22 affixed to the carriage 4, thereby forcing the slider 3 to the side of the magnetic recording medium 1.

Further, same as in preferred embodiment 1, a dimple 28 is formed on the surface facing the slider 3 of the load beam 22, and the slider 3 is connected to the load beam 22 so that it may contact with the slider 3 by way of a flexure 21 at a peak 27 of the dimples 28. The centerline 24 in the longitudinal direction of the load beam 22 is, same as in preferred embodiment 1, set to pass the center of rotation rotated by the action of a voice coil (not shown). The peak 27 of the dimple 28 is present on a plane passing three points, that is, the peaks of the two pivots 25 of the load beam 22 and the peak 27 of the dimple 28, and on a line 31 passing the middle of the line linking the peaks of the two pivots 25 and at right angle to the line linking the peaks of the two pivots 25, and the line 31 coincides with the neutral axis of torsion of the load beam 22. Accordingly, the shape of a side reinforcement 71 in each portion of the load beam 22 is determined so that the center of shearing of each section of the load beam 22 or the centroid may be located on the line 31.

Therefore, the head support device composed of the load beam 22 having such shape has the same effects as in preferred embodiment 1. That is, the peak 27 of the dimple 28 of the load beam 22 is not moved if torsional vibration occurs, and off-track does not occur if the magnetic head is moved to a desired track position at high speed, and the access time to the desired track position can be shortened, and further fluctuations of setting height of the load beam 22 due to manufacturing fluctuations are eliminated, and the resonance characteristic of the load beam 22 is stabilized in spite of impact, vibration or vibration by seek action for moving the magnetic head to the desired track, and higher resonance of torsion can be decreased, too. Moreover, by providing an opening forming holes, for example, in the middle of the plane 22a of the load beam 22, the weight may be reduced and the resonance characteristic of the load beam 22 can be adjusted at the same time, or by forming the load beam 22 by a thin plate, the weight and size can be reduced.

By applying the head support device having such structure, the head can be moved to a desired track position at high speed, and an excellent disk apparatus significantly shortened in the access time is realized.

Thus, according to preferred embodiment 2, having the same effects as in preferred embodiment 1, the resonance characteristic of the load beam can be stabilized if the setting height of the load beam fluctuates, the slider position is not changed despite torsional vibration, the head positioning control characteristic is enhanced, and the access time for moving the magnetic head to a desired track can be shortened.

Further, by forming holes in part of the load beam, or providing an opening by forming holes, or forming the load beam by using a thin plate, a head support device reduced in weight and size can be realized.

FIG. 9 shows an example of an opening 51 made of a hole in the longitudinal direction provided in the middle of the plane 22a of the load beam 22, but the shape and configuration of the opening is not limited to this example, and various shapes and configuration shown in FIG. 6 may be simiarly employed as in preferred embodiment 1.

In the explanation of the head support device in preferred embodiment 2 of the invention, same as in preferred embodiment 1, the load beam 22 has the side reinforcement 71 having a V-section at right and left sides, and a W-section on the whole, and it is symmetrical laterally but not symmetrical vertically, and the dimple 28 having the peak 27 is formed in the plane perpendicular to the plane 22a of the load beam 22 including the centerline 24 in its longitudinal direction, and the position of the peak 27 coincides on the perpendicular bisector of the line linking the peaks of the both pivots 25 at the neutral axis (line 31) of torsion, but the head support device in preferred embodiment 2 of the invention is not limited to this example alone, and the position of the peak 27 of the dimple 28 may be anywhere as far as the dimple 28 is formed on the plane 22a of the load beam 22, and it may be set at any position coinciding with the section of the load beam 22 and the center of shearing of each section parallel to the section. At this time, the neutral position of torsion is present on a plane passing the peaks of the two pivots 25 and the peak 27 of the dimple 28, and coincides with the line 31 passing the middle point linking the peaks of the two pivots 25 and the peak 27 of the dimple 28. Further, the line 31 is not required to be a straight line, but may be a moderate curve. In this case, needless to say, at least the section of the load beam 22 is not symmetrical to the centerline 24 in its longitudinal direction. At this time, however, the center of shearing of the section of the load beam 22 and each section parallel to this section is present on the plane passing three points, that is, the peaks of two pivots 25 of the carriage 4 and the peak 27 of the dimple 28 of the load beam 22, and on the line 31 passing the middle point of the line linking the peaks of the two pivots 25, but the line 31 is not perpendicular bisector linking the peaks of the two pivots 25, but the peak 27 of the dimple 28 can be matched with the neutral axis of torsion of the load beam 22.

By mounting such head support device, further, the disk apparatus is enhanced in the head positioning control characteristic, capable of moving the magnetic head to a desired track position at high speed, and substantially shortened in the access time.

Preferred Embodiment 3

FIG. 10 is a diagram explaining the head support device in preferred embodiment 3 of the invention, and FIG. 10(a) is a side view showing essential parts of the head support device in a cut-away view, and FIG. 10(b) is a partially magnified side view of FIG. 10(a). In FIG. 10, same constituent elements as in preferred embodiment 1 shown in FIG. 2(a) and FIG. 3 are identified with same reference numerals as in FIG. 2(a) and FIG. 3. Same as in preferred embodiment 1, the magnetic recording and reproducing apparatus is explained as the disk apparatus. What preferred embodiment 3 differs from preferred embodiment 1 is that the dimple is not formed in the load beam contacting with the gimbals of the flexure mounting the slider, but is formed in the gimbals of the flexure mounting the slider.

In FIG. 10, different from preferred embodiment 1 shown in FIG. 2(a), FIG. 3, and FIG. 4, the dimple 28 is not formed in the load beam 22, but the dimple 28 is formed in the flexure 21 mounting the slider 3, and the peak 27 of the dimple 28 contacts with: the surface of the slider 3 side of the load beam 22. The carriage 4, load beam 22, and slider 3 are disposed so that the peak 27 of the dimple 28 of the slider 3 may come on the perpendicular bisector of the line linking the peaks of the two pivots 25 of the carriage 4. The other configuration is same as in preferred embodiment 1 and preferred embodiment 2, and the detailed description is omitted herein.

In this head support device, same as in preferred embodiment 1, the shape of the side reinforcement in each portion of the load beam 22 is determined so that the neutral axis of torsion of the load beam 22, that is, the center of shearing at the section in each portion of the load beam 22, or the centroid may be present on a plane including the peaks of the two pivots 25 of the carriage 4 and the peak 27 of the dimple 28 of the slider 3, and on a line 31 passing the middle of the line linking the peaks of the two pivots 25 of the carriage 4. Herein, since the plate thickness of the plane 22a of the load beam 22 is very thin, the perpendicular bisector of the line present on the plane including the peaks of the two pivots 25 of the carriage 4 and the peak 27 of the dimple 28 of the slider 3, and linking the peaks of the two pivots 25 of the carriage 4 nearly coincides with the centerline in the longitudinal direction of the load beam 22.

Therefore, the head support device having such configuration and the disk apparatus comprising such head support device have the same effects as in the foregoing preferred embodiment 1 and preferred embodiment, and explanation of the effects is omitted to avoid duplication.

In preferred embodiment 3, the two pivots 25 may be also provided in the load beam 22 same as in preferred embodiment 2, but its specific description is omitted.

In the explanation of the head support device in preferred embodiment 3 of the invention, same as in preferred embodiment 1 and preferred embodiment 2, the load beam 22 has the side reinforcement 41 having a V-section at right and left sides, and a W-section on the whole, and it is symmetrical laterally but not symmetrical vertically, and the dimple 28 having the peak 27 is formed in the plane perpendicular to the plane 22a of the load beam 22 including the centerline 24 in its longitudinal direction, and the position of the peak 27 coincides on the perpendicular bisector of the line linking the peaks of the both pivots 25 at the neutral axis (line 31) of torsion, but the head support device in preferred embodiment 3 of the invention is not limited to this example alone, and the position of the peak 27 of the dimple 28 may be anywhere as far as the dimple 28 is formed on the plane 22a of the load beam 22, and it may be set at any position coinciding with the section of the load beam 22 and the center of shearing of each section parallel to the section. In such configuration, the same effects are obtained.

In the load beam 22 of the head support device in preferred embodiment 3 of the invention, too, an opening may be formed in the plane of the load beam 22, and the weight and size can be reduced, and also the resonance characteristic of the load beam 22 can be adjusted. The shape and configuration of the opening may be same as explained in preferred embodiment 1.

According to preferred embodiment 3, same effects as in preferred embodiment 1 and preferred embodiment 2 are obtained, and if the setting height of the load beam fluctuates, the resonance characteristic of the load beam may be stabilized, and the slider position is not changed by torsional vibration, and the head positioning control characteristic is enhanced, and the access time of moving the magnetic head to a desired track can be shortened.

Besides, the opening made of holes may be formed, for example, in part of the load beam or the load beam may be formed by using a thin plate, and therefore the head support device reduced in weight and size can be realized.

By mounting such head support device, further, the disk apparatus is enhanced in the head positioning control characteristic, capable of moving the magnetic head to a desired track position at high speed, and substantially shortened in the access time.

Preferred Embodiment 4

Figure 11:
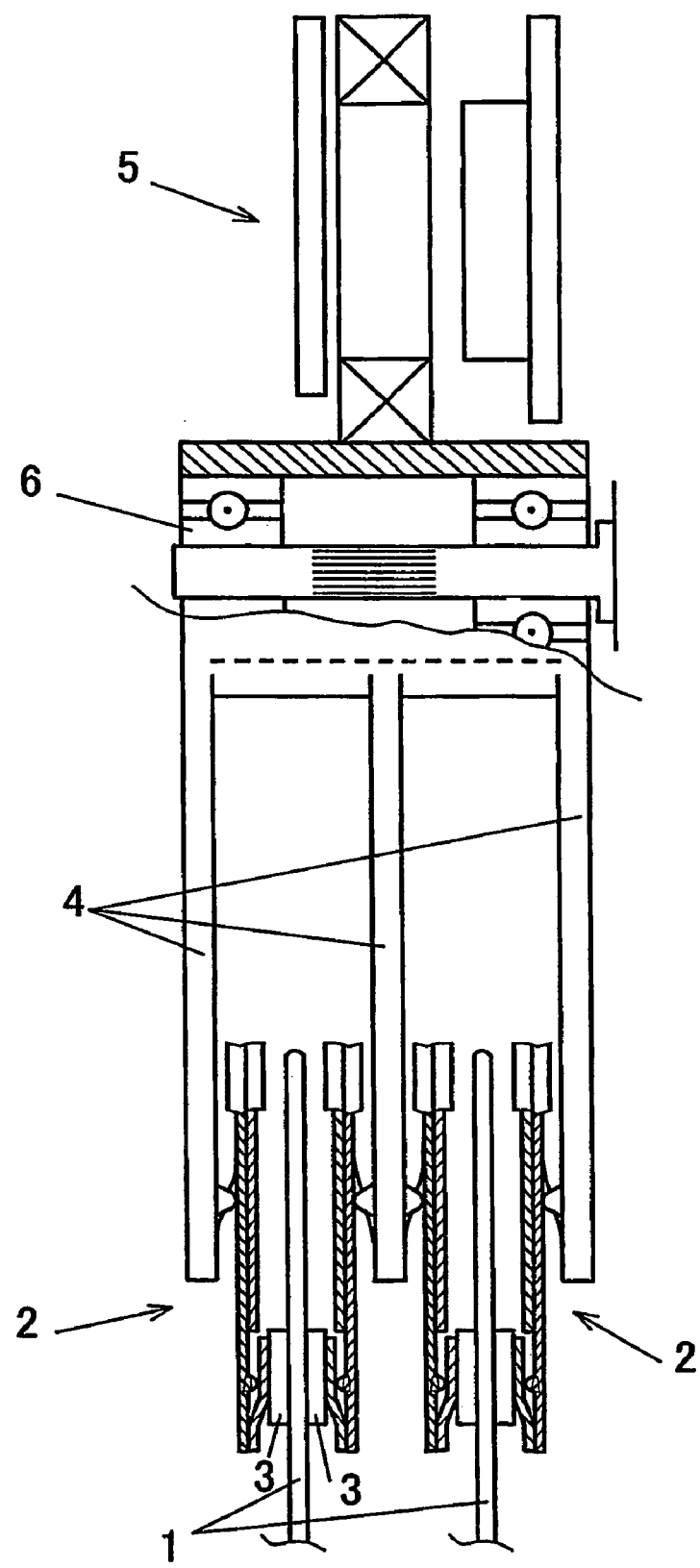
FIG. 11 is a side view showing part of head support device and disk of disk apparatus in preferred embodiment 4 of the invention.
Figure 13:
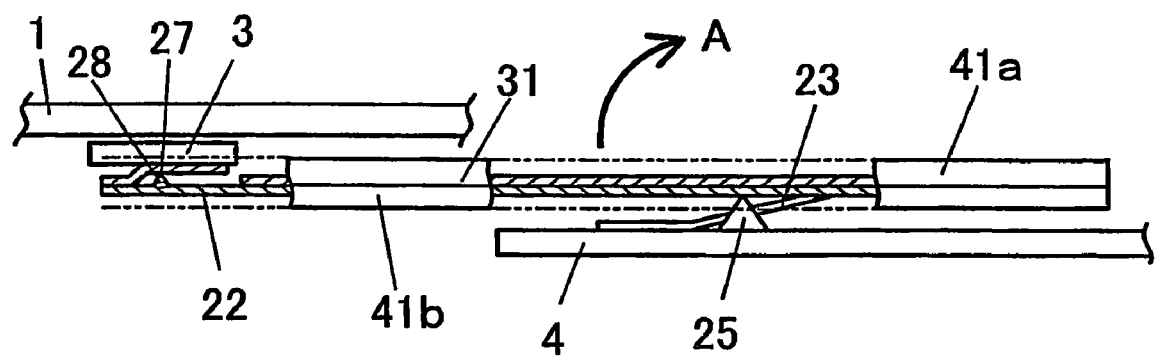
FIG. 13 is a cut-away side view of essential parts of head support device in preferred embodiment 4 of the invention.

FIG. 11, FIG. 12, and FIG. 13 are diagrams explaining the head support device of a disk apparatus in preferred embodiment 4 of the invention. FIG. 11 is a side view showing the head support device of the disk apparatus in preferred embodiment 4 together with part of the disk such as magnetic recording medium. FIG. 12(a) is a perspective view of essential parts showing a schematic structure of the head support device of preferred embodiment 4, and FIG. 12(b) is a perspective exploded view of essential parts showing a schematic structure of the head support device of preferred embodiment 4. FIG. 13 is a partially cut-away side view of essential parts of the head support device in preferred embodiment 4. FIG. 11, FIG. 12, and FIG. 13 correspond to FIG. 1, FIG. 2, and FIG. 3 of preferred embodiment 1, respectively, and same constituent elements as in FIG. 1, FIG. 2, and FIG. 3 are identified with same reference numerals. Same as in preferred embodiment 1, the magnetic recording and reproducing apparatus is explained as the disk apparatus, but to avoid duplication of similar explanation as in preferred embodiment 1, mainly different points are described below.

As shown in FIG. 11 and FIG. 12, the head support device 2 in preferred embodiment 4 of the invention has a slider 3 mounting a magnetic head (not shown) at one end, and a flexure 21 having gimbals 20 integrally forming a thin metal plate of SUS or the like and a flexible wiring board is affixed to a load beam 22, of which one part has an elastic member 23 made of plate spring or the like, and the open end of the elastic member 23 is affixed to a carriage 4 by known method such as spot welding method, ultrasonic welding method, or laser welding method. The elastic member 23 may be also made of a different member from the load beam 22. The carriage 4 has two pivots 25 disposed at right ad left symmetrical positions across the centerline in its longitudinal direction. Therefore, by overcoming the elastic force of the elastic member 23 of the load beam 22 affixed to the carriage 4, the rotary portion (the portion excluding the elastic member 23) of the load beam 22 is pushed up so as to rotate in the direction of arrow A in FIG. 13 about the two pivots 25, and the slider 3 disposed on the load beam 22 is forced to the side of the magnetic recording medium 1 so that the slider 3 may press the surface of the magnetic recording medium 1. A balancer 26 is affixed to the end of the load beam 22 at the opposite side of the slider 3 side, and the total center of gravity in the direction of the magnetic recording medium 1 of the rotary portion of the load beam 22, the flexure 21 having the slider 3 and the balancer 26 is located on the line linking the peaks of the two pivots 25 of the carriage 4, and this line is the axis of rotation, and it is composed to be present on a plane perpendicular to the magnetic recording medium 1 including this axis of rotation. Hence, if receiving an impact or the like from outside, there is no force acting to rotate the load beam 22 about the axis of rotation linking the peaks of the two pivots 25 of the carriage 4, and hence the slider 3 does not collide against and damage the surface of the magnetic recording medium 1.

On the surface facing the slider 3 of the load beam 22, further, there is a dimple 28 having a peak 27 on a face perpendicular to the plane 22a of the load beam 22 including the centerline 24 in its longitudinal direction, and at the peak 27, the load beam 22 oscillatably supporting the slider 3 is connected by way of the flexure 21. By the peak 27 of the dimple 28, the load beam 22 and the slider 3 contact with each other directly or by way of the flexure 21, and the slider 3 can move freely along the rotating motion of the surface of the magnetic recording medium 1. The centerline 24 in the longitudinal direction of the load beam 22 is set so as to pass through the center of rotation rotated by the action of the voice coil (not shown) provided on the carriage 4 or the like. The peak 27 of the dimple 28 may be designed to contact with the slider 3 directly, instead of supporting the slider 3 by way of the flexure 21.

Figure 14:
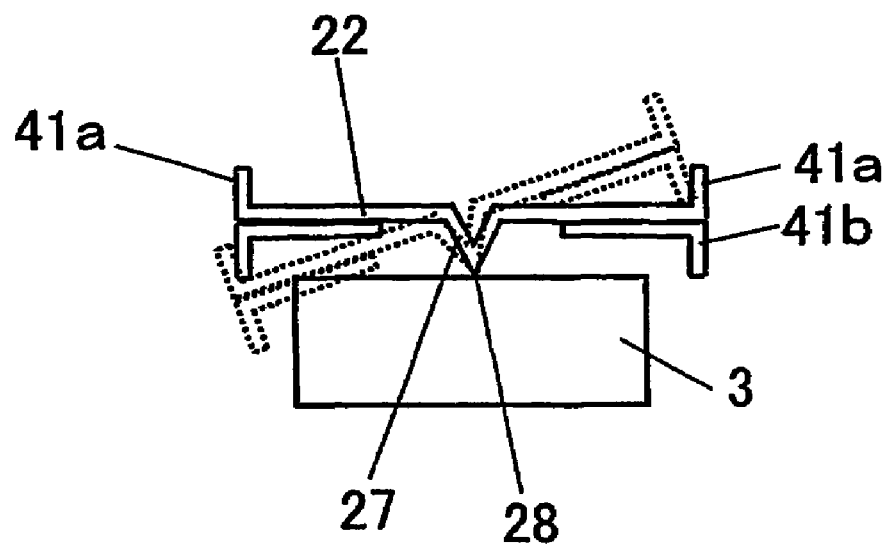
FIG. 14 is a sectional view of load beam cut off at a plane passing through the dimple peak of head support device in preferred embodiment 4 of the invention.

These configurations are same as in preferred embodiment 1. However, the head support device 2 of the disk apparatus in preferred embodiment 4 of the invention differs from preferred embodiment 1 in the structure of the load beam 22 and flexure 21. As clear from FIG. 14 given as a sectional view cut off by a plane perpendicular to the centerline 24 in FIGS. 12(a) and (b) and passing the peak 27 of the dimple 28, the load beam 22 and the flexure 21 of the head support device 2 in preferred embodiment 4 of the invention have side reinforcements 41a, 41b formed on almost entire surface of both right and left sides, and the structure has a pi-section. Both outer sides of principal parts, not the pi-shaped side reinforcements 41a, 41b of the load beams 22 and flexure 21, are mutually affixed to contact with each other, and an entire structure of H-section is formed.

The side reinforcements 41a, 41b formed in pi-section at both sides of the load beam 22 and flexure 21 may be formed either by bending process or by integrally forming other member. Instead of forming the side reinforcements 41a, 41b on the entire side surfaces, they may be formed only in a peripheral area of the opposite side of the slider 3 side end portion of the elastic member 23 at least from the slider 3 side end portion. By forming such side reinforcements 41a, 41b, the rigidity of the load beam 22 becomes very high, and as shown in a perspective view of schematic structure of essential parts of the head support device in FIG. 12(a), and therefore a plurality of openings 29 may be formed in the plane 22a of the load beam 22, or an opening 51 made of a hole in the longitudinal direction may be provided in the middle of the plane 22a of the load beam 22 as shown in FIG. 5, so that the weight may be reduced, and also the resonance characteristic of the load beam 22 may be adjusted. Also, near the elastic member 23, since the side reinforcements 41a, 41b are provided, the rigidity of the load beam 22 is increased, and it is effective to suppress vertical swing of the load beam 22 in the direction of the magnetic recording medium 1 side due to impact or vibration, lateral swing along the surface of the magnetic recording medium 1, or swing due to torsion, and the load beam 22 may be formed of a thin plate, thereby reducing in weight and size.

Examples of shape and configuration of the openings 29, 51 provided in the plane 22a of the load beam 22 include the opening 29 made of a plurality of holes provided in the plane 22a of the load beam 22 in FIG. 12(a) and the opening 51 made of a hole in the longitudinal direction provided in the middle of the plane 22a of the load beam 22 in FIG. 5, but the shape and configuration of the openings 29, 51 are not limited to these examples alone, but various shapes and configuration shown in FIG. 6 may be also employed same as explained in preferred embodiment 1.

Generally, when the head support device 2 moves the magnetic head to a desired track position at high speed, if torsional vibration occurs in the load beam 22, as far as the relative positions of the slider 3 and the peak 27 of the dimple 28 of the load beam 22 contacting therewith are invariable, off-track is not caused by the generated torsional vibration, and the access time to the target track position can be shortened, and to realize such configuration, it is required to match the position of the peak 27 of the dimple 28 of the load beam 22 with the neutral axis of torsion of the load beam 22, as already explained in preferred embodiment 1. As also explained, when the position of the peak 27 of the dimple 28 is defined at a position for forming the dimple 28 in the plane 22a of the load beam 22 and coinciding with the section of the load beam 22 and the center of shearing of each section parallel to this section, the neutral axis of torsion is on a plane passing the peaks of the two pivots 25 and the peak 27 of the dimple 28, and it further coincides with the line 31 passing the middle point of the line linking the peaks of the two pivots 25 and the peak 27 of the dimple 28.

In the head support device 2 of the disk apparatus in preferred embodiment 4 of the invention, the side reinforcements 41a, 41b are provided at both right and left sides, and the outer sides of the principal parts of the pi-shaped load beam 22 and flexure 21 are affixed to contact with each other, thereby forming an entire structure in an H-section, and its sections are symmetrical in both lateral direction and vertical direction, and therefore it is enough to match the centroid with the peak 27 of the dimple 28, not the center of shearing of the section of the structure in an H-shape combining the load beam 22 and flexure 21 integrally.

Therefore, in the head support device 2 of the disk apparatus in preferred embodiment 4 of the invention, in order that the line 31 (see FIG. 12) present on a plane passing three points, that is, the peaks of two pivots 25 of the carriage 4 and the peak 27 of the dimple 28 of the load beam 22, passing the middle point of the line linking the peaks of the two pivots 25, and at right angle to the line linking the peaks of the two pivots 25 may be the neutral axis of torsion of the load beam 22, and also that the centroid of the section of the load beam 22 and each section of the load beam 22 parallel to this section may be on the line 31, the side reinforcements 41a, 41b and the shape of the side reinforcements 41a, 41b in the individual portions of the load beam 22 are determined. In the load beam 22 having thus designed side reinforcements 41a, 41b, the peak 27 of the dimple 28 of the load beam 22 is not moved if torsional vibration occurs as indicated by broken line in FIG. 14, and if the magnetic head is moved to a desired track position at high speed, off-track does not occur, and the access time to the desired track position can be shortened.

In this configuration, the rigidity of the load beam 22 can be substantially increased by the side reinforcements 41a, 41b, and the position of the peak 27 of the dimple 28 of the load beam 22 is matched with the neutral axis of torsion of the load beam 22, and therefore if the setting height of the load beam 22, that is, the distance. between the carriage 4 and the magnetic recording medium 1 fluctuates due to manufacturing fluctuations, the resonance characteristic of the load beam 22 is stabilized in spite of impact or vibration due to external disturbance, or vibration due to seek motion of the magnetic head, and higher resonance of torsion can be decreased, and off-track hardly occurs.

The head support device 2 having such configuration can be applied, needless to say, in all head support devices including the head support device facing the upper side of the magnetic recording medium, and the magnetic head can be moved to a desired track position at high speed, and the disk apparatus shortened in the access time is realized. Hence, if the setting height of the load beam varies, the resonance characteristic of the load beam can be stabilized, and the slider position is not changes in spite of torsional vibration, and the head positioning control characteristic can be enhanced.

In the head support device in preferred embodiment 4 of the invention, instead of the structure explained in preferred embodiment 2, that is, instead of forming the two pivots on the carriage as shown in FIG. 8 and FIG. 9, two pivots may be formed at right and left symmetrical positions across the centerline in the longitudinal direction of the load beam.

Figure 15:
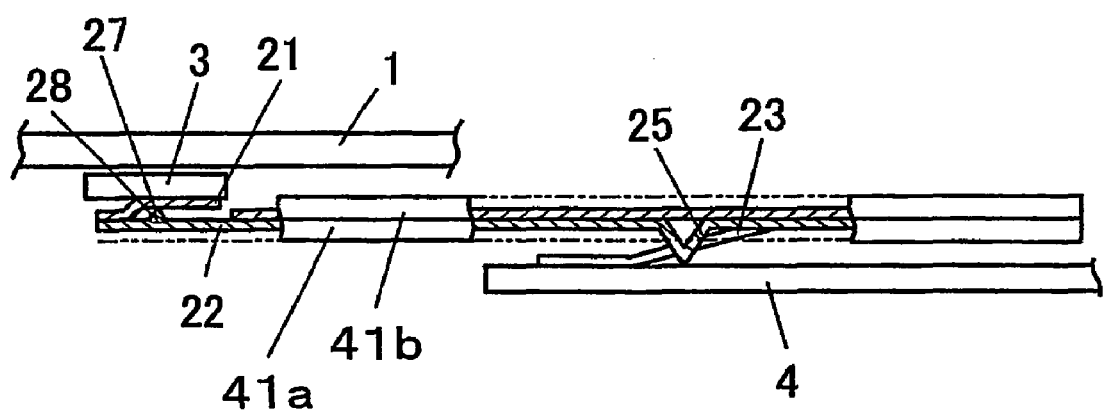
FIG. 15 is a cut-away side view of essential parts of other head support device in preferred embodiment 4 of the invention.
Figure 19:
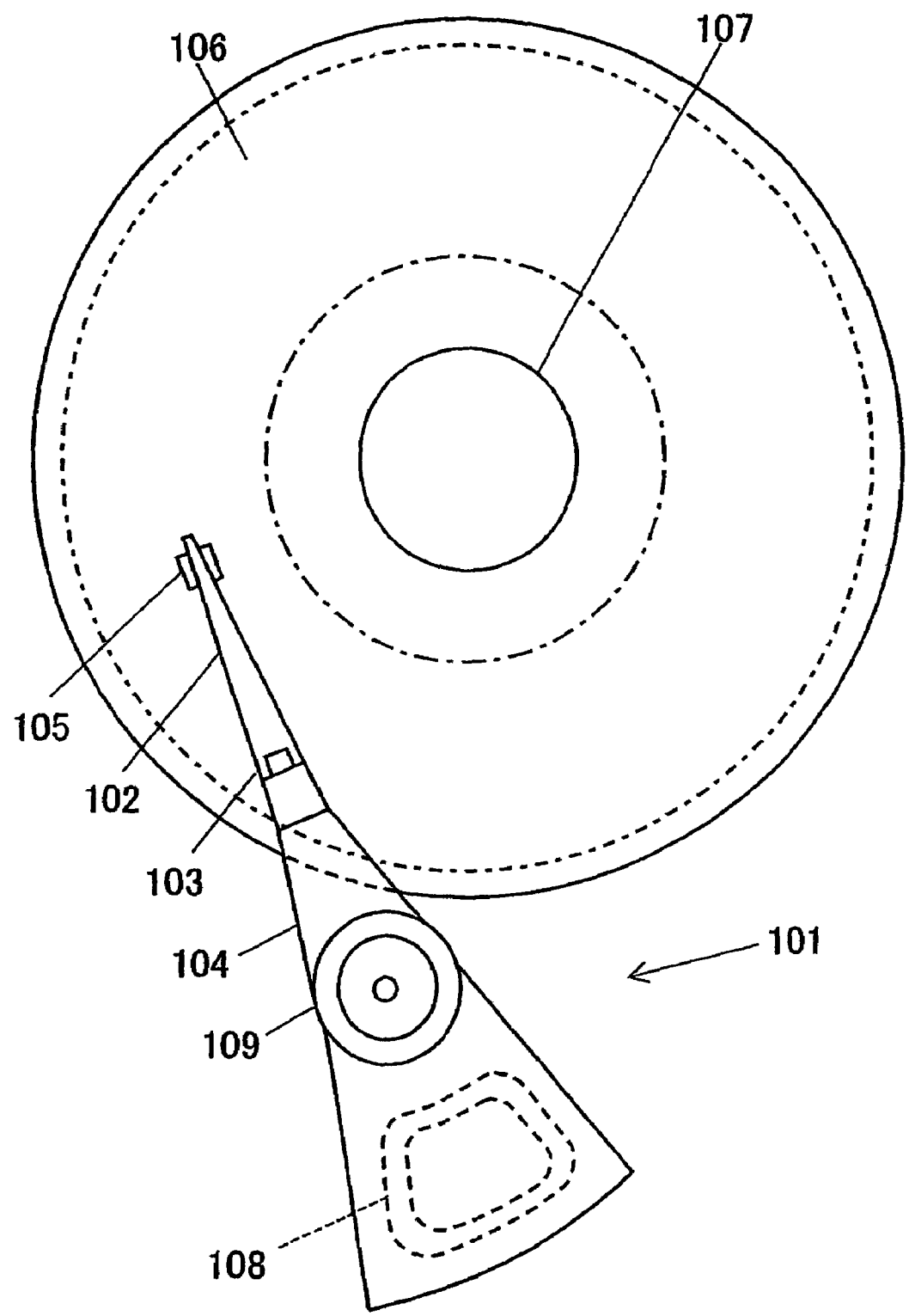
FIG. 19 is a plan view showing structure of essential parts of a conventional magnetic recording and reproducing apparatus.
Figure 20:
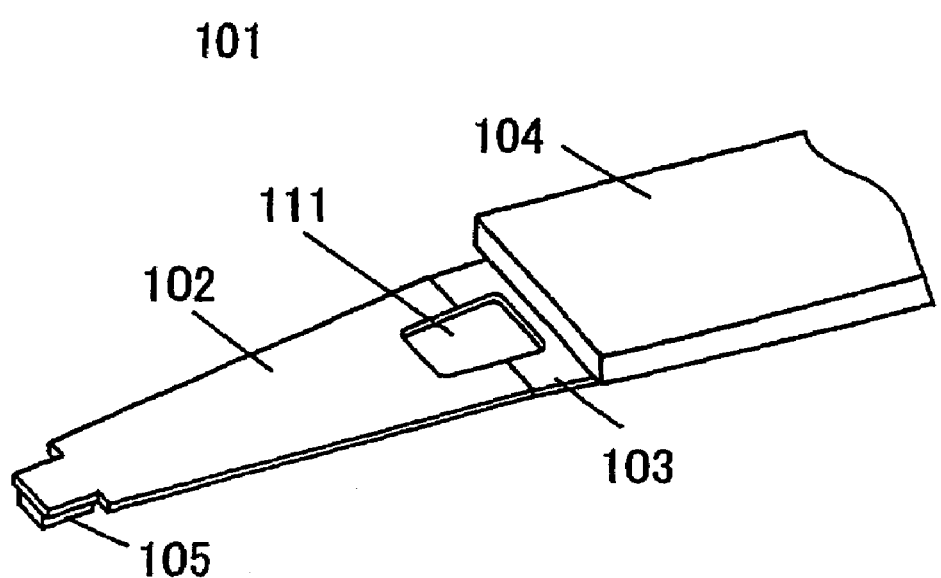
FIG. 20 is a perspective view of essential parts for explaining the structure and action of a conventional head support device.

FIG. 15 and FIG. 16 are diagrams showing other structure of head support device in preferred embodiment 4 of the invention, that is, same structure as in preferred embodiment 2. FIG. 15 is a partially cut-away side view of essential parts of the head support device, and FIG. 16 is a perspective view of the load beam as seen from the slider mounting side. In FIG. 15 and FIG. 16, same reference numerals are given to same constituent elements of preferred embodiment 2 shown in FIG. 8 and FIG. 9. In the head support device of this structure, the load beam 22 and the flexure 21 have side reinforcements 41a, 41b formed on almost entire surface of both right and left sides, and the structure has a pi-section, and both outer sides of principal parts, not the pi-shaped side reinforcements 41a, 41b of the load beams 22 and flexure 21, are mutually affixed to contact with each other, and an entire structure of H-section is formed. Thus, what differs from preferred embodiment 2 is that the side reinforcements 41a, 41b are formed and the pi-shaped load beam 22 and flexure 21 obtained, and other structures and action and effect as the head support device are same as in preferred embodiment 2, and the explanation is omitted to avoid duplication.

Further, in the head support device in preferred embodiment 4 of the invention, it may be also composed as explained in preferred embodiment 3, that is, as shown in FIG. 10, without forming dimple in the load beam contacting with the gimbals of the flexure mounting the slider, the dimple may be formed in the gimbals of the flexure having the slider. In the head support device of such configuration, same effects are obtained, that is, the resonance characteristic of the load beam 22 can be stabilized in spite of impact or vibration, and higher resonance of torsion can be decreased, and off-track occurs hardly.

Besides, the opening made of holes may be formed in part of the load beam 22 or the load beam may be formed by using a thin plate, and therefore the head support device reduced in weight and size can be realized.

By mounting such head support device, further, the disk apparatus is enhanced in the head positioning control characteristic, capable of moving the magnetic head to a desired track position at high speed, and substantially shortened in the access time.

Preferred Embodiment 5

FIG. 17 and FIG. 18 are diagrams explaining the head support device of a disk apparatus in preferred embodiment 5 of the invention. FIG. 17(a) is a perspective view of essential parts showing a schematic structure of the head support device in preferred embodiment 5, and FIG. 17(b) is a perspective exploded view of essential parts showing a schematic structure of the head support device in preferred embodiment 5. FIG. 18 is a sectional view of a load beam 22 shown in a section of a plane perpendicular to the centerline 24 in FIG. 17(a) and passing a peak 27 of a dimple 28. What preferred embodiment 5 of the invention differs from the foregoing preferred embodiments 1 to 4 is that a resin is outserted in side reinforcements 161 at both sides of the load beam 22. In this composition, the weight of the load beam 22 is reduced significantly, and the resonance frequency can be enhanced. Moreover, when the neutral axis of torsion of the load beam 22 is matched with a line 31 linking the middle point of the line segment linking the peaks of a pair of (two) pivots 25 of the carriage 4 and the peak 27 of the dimple 28, the rib shape of the side reinforcement 161 can be designed at a higher degree of freedom by forming the resin. Further, the plane shape of the load beam 22 can be designed in other shape than trapezoidal shape, and the load beam weight can be further reduced.

By mounting such head support device, further, the disk apparatus is enhanced in the head positioning control characteristic, capable of moving the magnetic head to a desired track position at high speed, and substantially shortened in the access time.

In the foregoing preferred embodiments 1 to 5, the head support device of the magnetic recording and reproducing apparatus using the magnetic head is explained, but same effects are obtained when used as the head support member and head support device in contact-free type disk recording and reproducing apparatus, for example, such as optical disk apparatus or magneto-optical disk apparatus.

INDUSTRIAL APPLICABILITY

According to the head support device of the invention, as described herein, the load beam and carriage contact with each other by means of two pivots, the slider mounted on the flexure and the load beam contact with each other by means of a dimple, the slider mounting the head presses against the recording medium, the center of shearing of the section of the load beam by a plane perpendicular to the recording medium passing at least the peak of the dimple (or the centroid when the section is symmetrical both vertically and laterally) coincides with the peak of the dimple, and side reinforcements are provided at both edge sides of the load beam.

By such configuration of the head support device, if the setting height of the load beam fluctuates, the resonance characteristic of the load beam can be stabilized, and the slider position is not changed in spite of torsional vibration, and the head positioning control characteristic is enhanced, and further the access speed of moving the head to a desired track can be enhanced, and the access time can be shortened. For example, by reinforcing the rigidity of the load beam by composing side reinforcements along the vicinity of the elastic member made of plate spring or the like, an opening made of holes, for example, may be formed in part of the load beam, or the load beam or side reinforcement can be formed by using, for example, thin metal plate or resin, so that a head support device reduced in weight and size can be realized.

By mounting such head support device, further, the disk apparatus of high reliability enhanced in the head positioning control characteristic, capable of moving the head to a desired track position at high speed, and substantially shortened in the access time can be realized.

The invention claimed is:

1. A head support device comprising:
a head, a load beam for supporting the head,
a bearing provided between the load beam and a carriage, and wherein the load beam is rotatable in a substantially perpendicular direction to a recording medium,
an elastic member for affixing the load beam to carriage, and
side reinforcements provided in the load beam,
wherein said elastic member is disposed between said carriage and said load beam, so that an applied force for the load beam is generated in a direction perpendicular to said recording medium.

2. A head support device comprising:
a head,
a load beam for supporting the head,
a dimple provided in the load beam,
a bearing provided between the load beam and a carriage, and wherein the load beam is rotatable in a substantially perpendicular direction to a recording medium,
an elastic member for affixing the load beam to carriage, and side reinforcements provided in the load beam,
wherein said elastic member is disposed between said carriage and said load beam, so that an applied force for the load beam is generated in a direction perpendicular to said recording medium.

3. A head support device comprising:
a head,
a load beam for supporting the head,
a bearing provided between the load beam and a carriage, and wherein the load beam is rotatable in a substantially perpendicular direction to a recording medium,
an elastic member for affixing the load beam to carriage, and
side reinforcements provided in the load beam,
wherein an opening is provided in the load beam, and
wherein said elastic member is disposed between said carriage and said load beam, so that an applied force for the load beam is generated in a direction perpendicular to said recording medium.

4. The head support device of any one of claims 1 to 3, wherein gimbals is provided between a slider mounting the head and the load beam.

5. The head support device of any one of claims 1 to 3, wherein the bearing is provided in the carriage, and the peak of the bearing contacts with the load beam.

6. The head support device of any one of claims 1 to 3, wherein the bearing is provided in the load beam, and the peak of the bearing contacts with the carriage.

7. The head support device of any one of claims 1 to 3, wherein the elastic member is formed integrally with the load beam.

8. The head support device of any one of claims 1 to 3, wherein the bearing is composed of two pivots.

9. The head support device of any one of claims 1 to 3, wherein the bearing is composed of a pair of pivots.

10. The head support device of any one of claims 1 to 3, wherein the load beam is rotatable about the bearing as the center of rotation.

11. The head support device of any one of claims 1 to 3, further comprising a second bearing rotatable in a radial direction on the recording medium, wherein the carriage rotates about the second bearing as the center of rotation.

12. The head support device of any one of claims 1 to 3, wherein the load beam is forced to a direction perpendicular to the surface of a slider mounting the head by a thrusting force by the elastic member.

13. The head support device of any one of claims 1 to 3, further comprising a flexure having a slider mounting the head disposed at an end portion of the load beam.

14. The head support device of claim 13, wherein the slider mounting the head is disposed in gimbals of the flexure.

15. The head support device of claim 1 or 2, wherein the side reinforcements are provided at both side edges of the load beam.

16. The head support device of claim 15, wherein the side reinforcements are made of resin.

17. The head support device of claim 15, wherein the side reinforcements are made of resin and are disposed in the load beam by integral forming.

18. The head support device of claim 1 or 2, wherein the side reinforcements are provided at both side edges of the load beam by bending process.

19. The head support device of claim 1 or 2, wherein the height of the side reinforcements greater than the thickness of the load beam.

20. The head support device of claim 18, wherein the shape of the section is like letter W at a section perpendicular to the centerline in the longitudinal direction of the load beam.

21. The head support device of claim 18, wherein the shape of the section is like letter H at a section perpendicular to the centerline in the longitudinal direction of the load beam.

22. The head support device of claim 21, wherein the shape of the entire section is like letter H, by adhering members having a pi-shaped section, at a section perpendicular to the centerline in the longitudinal direction of the load beam.

23. The head support device of claim 2, wherein the bearing is composed of two pivots, and the side reinforcements are formed on a plane of the load beam, being perpendicular to the line linking the middle point of the two pivots and the peak of the dimple, with the center of shearing of the section of the load beam passing the peak of the dimple, being at the same position as the peak of the dimple.

24. The head support device of claim 2, wherein the bearing is compose of two pivots, and the dimple provided in the load beam has its peak on a perpendicular bisector of the line linking the peaks of the pivots.

25. The head support device of claim 21, wherein the bearing is composed of two pivots, and the side reinforcements are formed, being perpendicular to the centerline in the longitudinal direction of the load beam, with the centroid at the position of center of gravity of the section of the load beam passing the peak of the dimple, being at the same position as the peak of the dimple provided in the load beam.

26. The head support device of claim 25, wherein the side reinforcements are formed at both side edges of the load beam, with the centroid at the position of center of gravity at the section perpendicular to the centerline in the longitudinal direction of the load beam, positioned on a plane passing the peaks of the two pivots and the dimple provided in the load beam.

27. The head support device of claim 25, wherein the side reinforcements are formed at both side edges of the load beam, with the centroid at the position of center of gravity at the section perpendicular to the centerline in the longitudinal direction of the load beam, positioned on a line linking the middle point of the line linking the peaks of the two pivots and the peak of the dimple.

28. The head support device of claim 3, wherein the opening is provided in the middle of the load beam.

29. The head support device of claim 3, wherein the opening is formed symmetrically to the centerline of the load beam.

30. The head support device of claim 3, wherein the opening is formed in circular, elliptical or polygonal shape.

31. The head support device of claim 3, wherein the opening is formed in a slit shape.

32. The head support device of claim 3, wherein the end portion of the opening is provided near the side reinforcements.

33. The head support device of claim 3, wherein at least two openings are provided, and each opening is formed at symmetrical position to the centerline of the load beam.

34. The head support device of any one of claims 1 to 3, wherein the bearing is composed of two pivots, and the load beam is provided with the balancer so that the direction of action of the total center of gravity in the recording medium direction of the flexure having the slider, the rotating portion of the load beam and the balancer may pass the axis of rotation linking the peaks of the pivots.

35. A disk apparatus comprising:
a recording medium,
a head,
a load beam supporting the head,
a bearing provided between the load beam and a carriage, and wherein the load beam is rotatable in a substantially perpendicular direction to a recording medium,
an elastic member for affixing the load beam to carriage, and
side reinforcements provided in the load beam,
wherein said elastic member is disposed between said carriage and said load beam, so that an applied force for the load beam is generated in a direction perpendicular to said recording medium.

36. A disk apparatus comprising:
a recording medium,
a head,
a load beam supporting the head, a bearing provided between the load beam and a carriage, and wherein the load beam is rotatable in a substantially perpendicular direction to a recording medium, an elastic member for affixing the load beam to carriage, and wherein an opening is provided in the load beam, and wherein said elastic member is disposed between said carriage and said load beam, so that an applied force for the load beam is generated in a direction perpendicular to said recording medium.

37. The disk apparatus of claim 35 or 36, wherein gimbals is provided between the slider mounting the head and the load beam.

38. The disk apparatus of claim 35 or 36, wherein the bearing is provided in the carriage, and the peak of the bearing contacts with the load beam.

39. The disk apparatus of claim 35 or 36, wherein the bearing is provided in the load beam, and the peak of the bearing contacts with the carriage.

40. The disk apparatus of claim 35 or 36, wherein the elastic member is formed integrally with the load beam.

41. The disk apparatus of claim 35 or 36, wherein the bearing is composed of two pivots.

42. The disk apparatus of claim 35 or 36, wherein the bearing is composed of a pair of pivots.

43. The disk apparatus of claim 35 or 36, wherein the load beam is rotatable about the bearing as the center of rotation.

44. The disk apparatus of claim 35 or 36, further comprising a second bearing rotatable in a radial direction on a recording medium, wherein the carriage rotates about the second bearing as the center of rotation.

45. The disk apparatus of claim 35 or 36, wherein the load beam is forced to a direction perpendicular to the surface of the slider by a thrusting force by the elastic member.

* * * * *

UNITED STATES PATENT AND TRADEMARK OFFICE
CERTIFICATE OF CORRECTION

PATENT NO. : 7,218,479 B2 Page 1 of 1
APPLICATION NO. : 10/497026
DATED : May 15, 2007
INVENTOR(S) : Hideki Kuwajima et al.

It is certified that error appears in the above-identified patent and that said Letters Patent is hereby corrected as shown below:

On the title page,

Under item "(57) ABSTRACT", change:

Line 5, "10a"  to -- 20 --
Line 8, "10b"  to -- 23 --
Line 9, "20"   to -- 22 --
Line 12 "20"   to -- 22 --
Line 12 "10b"  to -- 23 --

Signed and Sealed this

Twenty-ninth Day of July, 2008

JON W. DUDAS
*Director of the United States Patent and Trademark Office*